United States Patent
Akiyama

(10) Patent No.: US 9,747,324 B2
(45) Date of Patent: Aug. 29, 2017

(54) SYSTEM, APPARATUS, AND METHOD FOR TRANSFERRING UPDATES BETWEEN STORAGE DEVICES

(71) Applicant: FUJITSU LIMITED, Kawasaki-shi, Kanagawa (JP)

(72) Inventor: Takashi Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 209 days.

(21) Appl. No.: 14/169,671

(22) Filed: Jan. 31, 2014

(65) Prior Publication Data

US 2014/0297590 A1    Oct. 2, 2014

(30) Foreign Application Priority Data

Mar. 26, 2013 (JP) .................................. 2013-065071

(51) Int. Cl.
*G06F 17/30* (2006.01)

(52) U.S. Cl.
CPC .. *G06F 17/30371* (2013.01); *G06F 17/30575* (2013.01)

(58) Field of Classification Search
CPC .................... G06F 17/30371; G06F 17/30575
See application file for complete search history.

(56) References Cited

U.S. PATENT DOCUMENTS

| 2005/0076094 | A1* | 4/2005 | Sasaki | G06F 17/30581 709/217 |
| 2006/0155939 | A1* | 7/2006 | Nagasoe | G06F 3/062 711/152 |
| 2009/0217289 | A1* | 8/2009 | Onianwa | G06F 9/466 718/106 |
| 2013/0117226 | A1* | 5/2013 | Jain | G06F 17/30008 707/625 |
| 2015/0278329 | A1* | 10/2015 | Hrle | G06F 17/30575 707/615 |

FOREIGN PATENT DOCUMENTS

| JP | 4268141 | 5/2009 |
| JP | 2012-123670 | 6/2012 |
| WO | 2004/090726 | 10/2004 |

* cited by examiner

*Primary Examiner* — Rehana Perveen
*Assistant Examiner* — Huen Wong
(74) *Attorney, Agent, or Firm* — Fujitsu Patent Center

(57) ABSTRACT

A first information processing apparatus includes a unit to attach control information to update processing data containing update differential data per storage device and a unit to transfer the update processing data to a second information processing apparatus, and the second information processing apparatus includes a reflecting unit to reflect the update differential data in the transferred update processing data respectively to one or more storage devices, an exclusion setting unit to set exclusion of the storage device given in a list of the storage devices when the first reflecting unit of the reflecting unit reflects the top update differential data in the update processing data, and an exclusion cancelling unit to cancel the exclusion when the second reflecting unit reflects the last update differential data in the update processing data in the storage device.

6 Claims, 20 Drawing Sheets

FIG. 5A

| VALUE OF JOURNAL OF JOURNAL FILE 1 | |
|---|---|
| TRAN SEQUENCE NUMBER | : 3 |
| UPDATE DB NAME LIST | : DB1、DB2 |
| TRAN DIVISION COUNT | : 2 |
| UPDATE DB NAME | : DB1 |
| UPDATE DIFFERENTIAL DATA | : DATA OF DB1 |

FIG. 5B

| VALUE OF JOURNAL OF JOURNAL FILE 2 | |
|---|---|
| TRAN SEQUENCE NUMBER | : 3 |
| UPDATE DB NAME LIST | : DB1、DB2 |
| TRAN DIVISION COUNT | : 2 |
| UPDATE DB NAME | : DB2 |
| UPDATE DIFFERENTIAL DATA | : DATA OF DB2 |

FIG. 5C

MANAGEMENT TABLE STORED WITH INFORMATION
FOR ASSURING TRANSACTION TERMINATION SEQUENCE

| REFLECTION COMPLETION TRANSACTION SEQUENCE NUMBER (REFLECTION-COMPLETED TRANSACTION SEQUENCE NUMBER) |
| --- |
| (a) |

FIG. 5D

MANAGEMENT TABLE STORED WITH INFORMATION
FOR CONTINUING TO RETAIN EXCLUSIONS FOR TRANSACTION DIVISION COUNT

| IN-REFLECTION TRANSACTION SEQUENCE NUMBER (TRANSACTION SEQUENCE NUMBER LIST BEING REFERRED TO BY REFLECTING DEVICE AT PRESENT) | TRANSACTION DIVISION COUNT | |
| --- | --- | --- |
| | COMPLETION COUNT (REFLECTION COMPLETION COUNT IN WHOLE COUNT) | WHOLE COUNT (COUNT INDICATING HOW MANY JOURNAL FILES TO WHICH TRANSACTIONS ARE DISTRIBUTED) |
| (b1) | (c) | (d) |
| (b1) | (c) | (d) |
| : | : | : |

REFLECTION DEVICE COUNT EXISTING

IN-REFLECTION TRANSACTION SEQUENCE NUMBERS (b1) AND (b2) HAVE SAME CONTENT

FIG. 5E

MANAGEMENT TABLE STORED WITH INFORMATION
FOR AVOIDING DEADLOCK AND CANCELLING TRANSACTION SEQUENCE WAITING STATUS

| REFLECTING DEVICE NAME (NAME OF REFLECTING DEVICE) | IN-REFLECTION TRANSACTION SEQUENCE NUMBER (TRANSACTION SEQUENCE NUMBER LIST BEING REFERRED TO BY REFLECTING DEVICE AT PRESENT) | DB IN-USE REFLECTING DEVICE NAME (NAME OF REFLECTING DEVICE (OF WAIT-FOR-EXCLUSION PARTNER DEVICE) USING DB REFLECTED BY REFLECTING DEVICE) |
| --- | --- | --- |
| FOR JOURNAL 1 | (b2) | (e) |
| FOR JOURNAL 2 | (b2) | (e) |
| : | : | : |

REFLECTING DEVICE COUNT (JOURNAL FILE COUNT) EXISTING

IN-REFLECTION TRANSACTION SEQUENCE NUMBERS (b1) AND (b2) HAVE SAME CONTENT

SYSTEM, APPARATUS, AND METHOD FOR TRANSFERRING UPDATES BETWEEN STORAGE DEVICES

CROSS-REFERENCE TO RELATED APPLICATION

This application is based upon and claims the benefit of priority of the prior Japanese Patent Application No. 2013-065071, filed on Mar. 26, 2013, the entire contents of which are incorporated herein by reference.

FIELD

The embodiments discussed herein are related to an information processing system, an information processing apparatus and an information processing method.

BACKGROUND

At a computer center etc, such a mode is known that a copy of a database (which is abbreviated to DB) used by the computer center is created in, e.g., a sub-computer center installed in a different location in preparation against an emergency such as occurrence of a disaster. Further, for instance, such a mode is also known that with an expansion of tasks etc, the database used by a main computer etc is copied, and a new task is carried out in such a way that a computer (sub-computer) different from the main computer uses the copied database (which is referred to as a replica DB).

Known as a method of creating the replica DB is a method of acquiring, e.g., a file (journal file) of update differential data (which are termed journals) given when updating the DB used by the main computer and transferring the acquired journal file to the sub-computer. The sub-computer extracts the update differential data given when updating the DB that are contained in the journal file, and reflects the update differential data in the replica DB used by the sub-computer, thereby ensuring the latest property of the replica DB.

If there exists a plurality of DBs used by the main computer, the main computer updates the plurality of DBs with one transaction, and a matching property between the plurality of DBs used by the main computer is assured by the transaction. The terminology "transaction" is defined as a single (isolated) work-unit (in a database environment) into which a plurality of related processes are aggregated, and the processes managed as the transaction result in "all gets successful" or "all gets into failure".

For example, "sales DB" and "stock DB" are assumed as the plurality of DBs used by the main computer. If the matching property between "sales DB" and "stock DB" is assured by the transaction, a sales numerical value managed in "sales DB" rises as a sales count increases, while a stock numerical value managed in "stock DB" decreases at the same timing as the sales numerical value rises.

The matching property between "sales DB" and "stock DB" can be assured also by the transaction in a mode of transferring the journal file between the main computer and the sub-computer as described above. For instance, the main computer acquires the journal file by aggregating the journals of the plurality of DBs into one journal file and transfers the journal file to the sub-computer. The sub-computer may also aggregate the transferred journals into one transaction in the same way as the main computer does, and may reflect the transaction in the plurality of replica DBs.

Thus, also in the sub-computer using the plurality of replica DBs, the matching property between the replica DBs is assured by the transaction, and hence a task of referring to the replica DB can be operated even in the midst of performing the reflecting process in the replica DB.

It is to be noted that the following patent documents exist by way of the documents of the prior arts containing descriptions of technologies related to the technology, which will be discussed in the present specification.

DOCUMENTS OF PRIOR ARTS

Patent Documents

[Patent Document 1] Japanese Laid-Open Patent Publication No. 2012-123670
[Patent Document 2] Japanese Patent No. 4268141

SUMMARY

One aspect of the embodiment of the disclosure is exemplified by a configuration of an information processing system that follows. Namely, an information processing system has a first information processing apparatus including a plurality of first storage devices, and a second information processing apparatus including a plurality of second storage devices in which to reflect results of update processes with respect to the plurality of first storage devices. Then, the first information processing apparatus includes: a unit to attach control information containing identifying information of each of the update processes and a list of one or more first storage devices of the plurality of first storage devices updated by the update processes to update processing data containing update differential data per storage device when executing the update processes managed in aggregation to update the one or more first storage devices; and a unit to transfer the update processing data attached with the control information to the second information processing apparatus. Then, the second information processing apparatus includes: one or more reflecting units to reflect the update differential data in the update processing data attached with the control information and thus transferred from the first information processing apparatus in each of one or more second storage devices of the plurality of second storage devices, which correspond to one or more first storage devices; an exclusion setting unit to set, when a first reflecting unit among the one or more reflecting units reflects top update differential data in update processing data in a corresponding storage device among the plurality of second storage device, exclusion in the one or more second storage devices, which correspond to the one or more first storage devices updated by the update processes of the first information processing apparatus, the one or more first storage devices being given in the list; and an exclusion cancelling unit to cancel, when a second reflecting unit among the one or more reflecting units reflects last update differential data in the update processing data in corresponding storage device among the plurality of second storage device, the exclusion of the one or more second storage devices, which correspond to the one or more first storage devices updated by the update processes of the first information processing apparatus, the one or more first storage devices being given in the list.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 5A is a diagram illustrating an example of a journal attached with control information;

FIG. 5B is a diagram illustrating an example of the journal attached with control information;

FIG. 5C is a diagram illustrating an example of a management table stored in a reflection state management file;

FIG. 5D is a diagram illustrating an example of the management table stored in the reflection state management file;

FIG. 5E is a diagram illustrating an example of the management table stored in the reflection state management file;

DESCRIPTION OF EMBODIMENTS

An increase in quantity of the DBs leads to a rise in number of journal processing targets, and hence there is an increased I/O load on processing the journal files, resulting in a decline of throughput of the main computer using the plurality of DBs.

For reducing the I/O load on processing the journal files, for instance, such a mode is considered that the journal files are distributed on a per predetermined DB group (DB Group) basis, and the distributed journal files are transferred in parallel to the sub-computer and reflected in the replica DBs. In the case of distributing the journal files, however, timing when the journal files transferred in parallel reach the sub-computer depends on a transfer interval of the journal files, a data size, a state of a communication line, etc. Therefore, in the case of reflecting the journal in the replica DB per transferred journal file, there exists a problem that mismatching occurs between the replica DBs assured by the transaction.

An information processing system according to one embodiment will hereinafter be described with reference to the drawings. A configuration of the following embodiment is an exemplification, and the information processing system is not limited to the configuration of the embodiment.

The information processing system will hereinafter be described based on the drawings in FIGS. 1 through 18. Note that in the following discussion, a database (Date Base) is abbreviated to "DB", and a copied database is referred to as a "replica DB". The replica DB includes a plurality of DBs. Further, update differential data given when updating the DB are termed a "journal", in which the update differential data are acquired, and what the acquired update differential data are compiled into a file is referred to as a "journal file". The journal file includes a plurality of journals.

First Comparative Example

Figure 1:
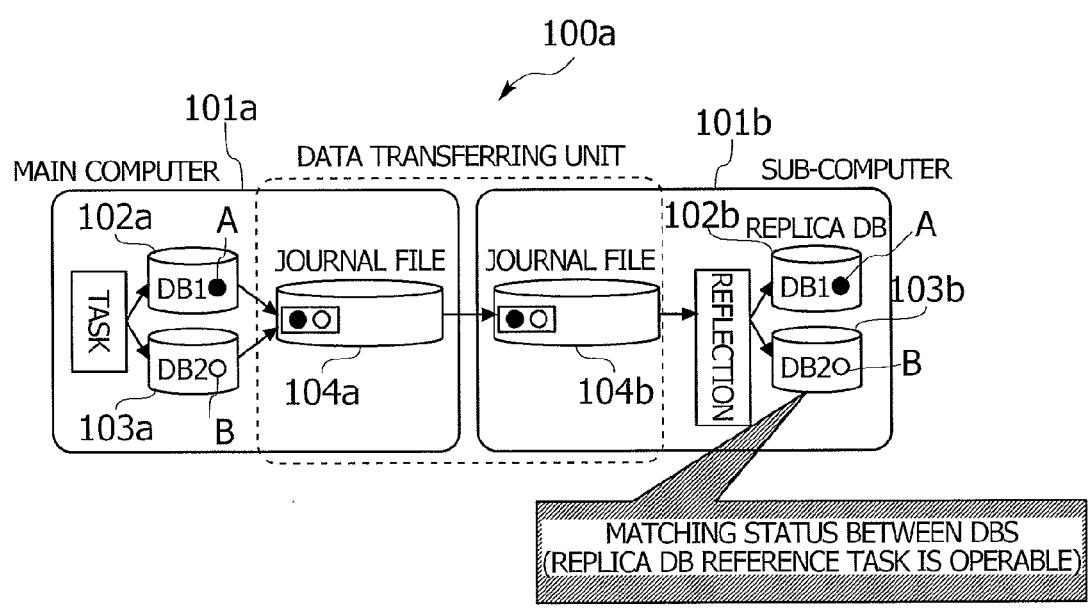
FIG. 1 is a diagram illustrating a comparative example of an information processing system.
Figure 2:
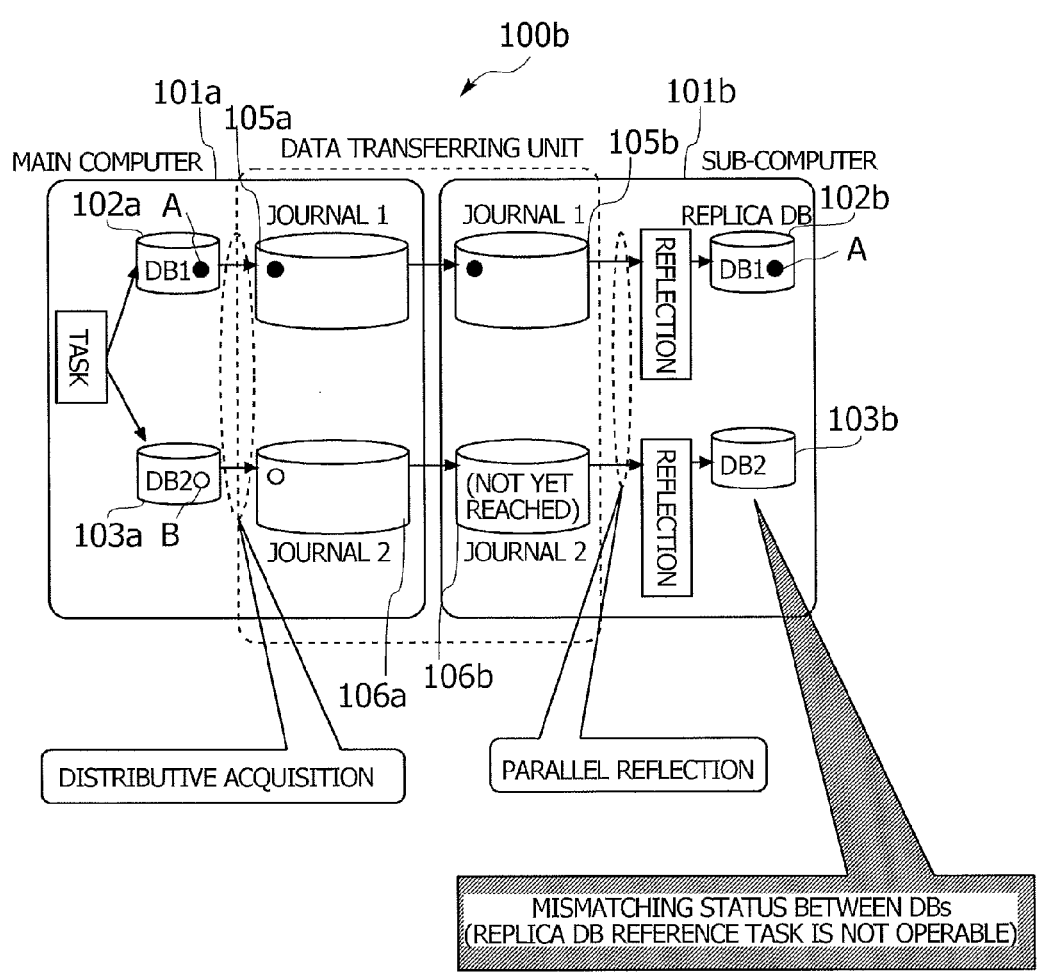
FIG. 2 is a diagram illustrating a comparative example of the information processing system.

To start with, a matching property between the plurality of copied DBs will be described based on the drawings in FIGS. 1 and 2. The information processing system according to the first comparative example is defined as a computer system including a main computer that uses the plurality of DBs and a sub-computer that uses the replica DB, in which the main computer updates the plurality of DBs with one transaction. FIG. 1 illustrates a mode of acquiring one journal file into which the journals given when updating the DBs are aggregated, and reflecting the acquired journal file in the replica DB. FIG. 2 illustrates a mode of acquiring a plurality of journal files into which the journals given when updating the DBs are distributed, and reflecting these distributed journal files in the replica DB.

In a computer system 100a in FIG. 1, a symbol "black circle" represents a journal A of a DB 102a (DB1 in FIG. 1), while a "white circle" represents a journal B of a DB 103a (DB2 in FIG. 1). The journal of each DB is updated with one transaction. A main computer 101a acquires one journal file 104a into which the respective journals are aggregated, and transfers the one aggregated journal file 104a to a sub-computer 101b. Note that a data transferring unit between the main computer 101a and the sub-computer 101b is not, if capable of transferring the acquired journal file, limited to the transfer unit. For example, the data transferring unit can be exemplified by a file transfer unit to transfer the acquired update differential data on a file-by-file basis in a lump, a message queue unit to transfer the update differential data sequentially, and so on. Further, the data transferring unit may be a mirroring disc unit to assure file equivalency between the main computer 101a and the sub-computer 101b.

In the sub-computer 101b, the individual journals of the transferred journal file 104b are aggregated by way of one transaction in the same way as by the main computer 101a and thus reflected in the replica DB, thereby assuring the matching property between the plurality of DBs included in the replica DB. Namely, the journal A indicated by the symbol "black circle" in the replica DB 102b corresponding to the DB 102a and the journal B indicated by the symbol "white circle" in the replica DB 103b corresponding to the DB 103a, are updated with one transaction. Therefore, in the replica DBs, mismatching does not occur in the data between one replica DB and another replica DB after completing the transaction.

In the computer system 100b in FIG. 2, the main computer 101a acquires the journals given when updating the DBs in a way that distributes the journals into the journal file 105a (which is written also as a journal file 1 in FIG. 2) and the journal file 106a (which is written also as a journal file 11 in FIG. 2). The journals A indicated by the symbol "black circle" of the DB 102a (the DB1 in FIG. 2) are acquired in distribution into the journal file 105a, while the journals B indicated by the symbol "white circle" of the DB 103a (the DB2 in FIG. 2) are acquired in distribution into the journal file 106a, respectively. Note that in the main computer 101a, in the same way as by the computer system 100a illustrated in FIG. 1, the journals in the respective DBs are updated with one transaction.

The respective journal files on a DB-by-DB basis, which are acquired by the main computer 101a, are transferred to the sub-computer 101b via the data transferring unit. A journal file 105b (which is written also as the journal file 1 in FIG. 2) and the journal file 106b (which is written a journal file 2 in FIG. 2) in the sub-computer 101b of FIG. 2 are the journal files in a reaching status at a certain point of time.

In FIG. 2, the journal file 105a transferred from the main computer 101a has reached the sub-computer 101b, and hence the journal file 105b contains the journal A indicated by the symbol "black circle" in the DB 102a. On the other hand, the journal file 106a transferred from the main computer 101a has not yet reached the sub-computer 101b in the illustrated status, and therefore the journal file 106b does not contain the journals B indicated by the symbol "white circle" in the DB 103a.

Thus, in the case of transferring the journal file in distribution into the plurality of journal files, a time difference occurs between the journal files reaching the sub-computer 101b in a way that depends on a transfer interval of the journal files, a data size, a status of a communication line, etc. As a result, it follows that a reaching sequence occurs in the sub-computer 101b among the journal files transferred to the sub-computer 101b.

In the sub-computer 101b, the respective journal files transferred in distribution undergo execution of an updating process in parallel in the way of being targeted at the replica DBs corresponding to thereto, respectively. Namely, in the sub-computer 101b, it follows that the replica DBs are updated in the status where the reaching sequence occurs among the journal files. In the example of FIG. 2, the journal A indicated by the symbol "black circle" of the journal file 105b is reflected in the replica DB 102b corresponding to the DB 102a. However, the journal B indicated by the symbol "white circle" is not reflected in the replica DB 103b corresponding to DB 103a because the journal file 106b does not yet reach.

Thus, if the replica DBs are updated in the status where the reaching sequence occurs, it follows that the mismatching appears between the replica DBs, in which the journal is reflected in one DB, while the journal is not yet reflected in another DB. The example in FIG. 2 is the case that the journal file 106a reaches subsequent to the journal file 105a, however, such a case may arise that the journal file 105a reaches subsequent to the journal file 106a.

In the status where the mismatching occurs between the replica DBs in FIG. 2, for instance, a reference task on the sub-computer 101b is not performed, which leads to standing by for completion of updating the journal B indicated by the symbol "white circle" to the replica DB 103b corresponding to the DB 103a in order to execute an operation for the reference task. The sub-computer 101b is disabled from, for a period till entirely completing the reflections of the distributed journals to the replica DBs, getting the reference task to operate and is not therefore effectively utilized. Hence, in the computer system 100a depicted in FIG. 2, the journal files are distributed, and an I/O load related to processing the journal files is thus reduced, and nevertheless such a problem exists that a task response on the side of the sub-computer is decreased.

The information processing system according to the embodiment, which will be next discussed in a first working example, acquires the update differential data related to the plurality of DBs by distributing the update differential data into the plurality of journal files, transfers the respective journal files to the sub-computer, and, even in a case where the sub-computer reflects these journal files in the replica DBs in parallel, assures the matching property between the replica DBs.

First Working Example

Figure 3:
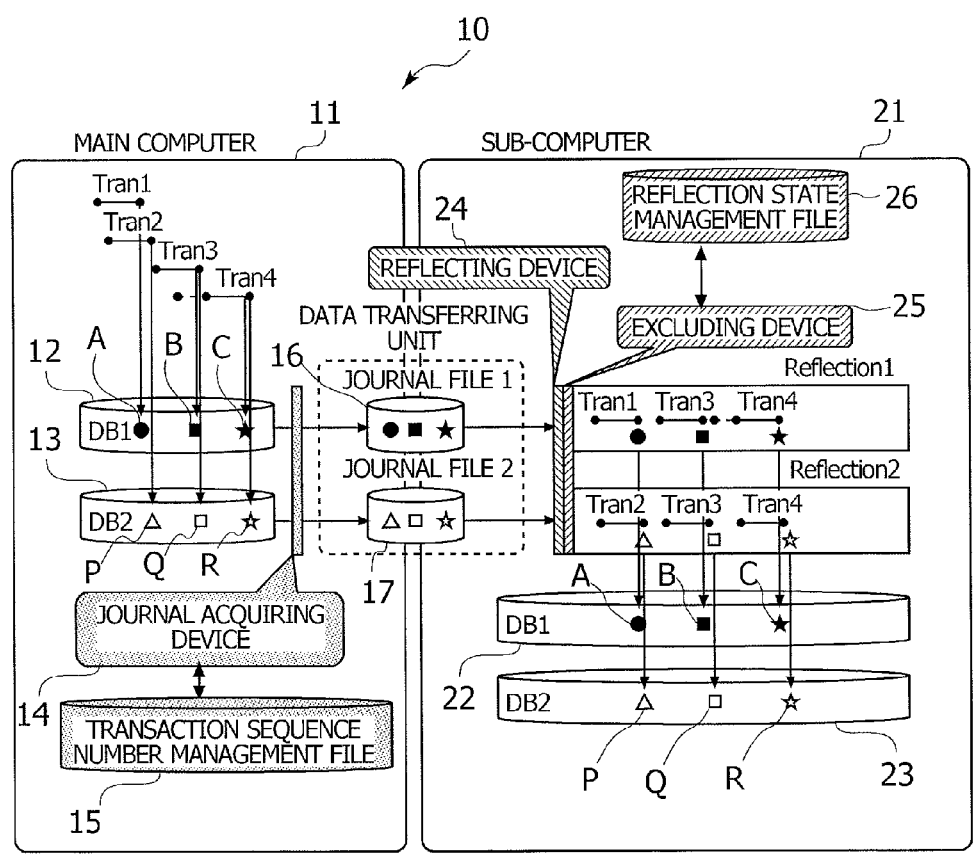
FIG. 3 is a diagram illustrating one working example of the information processing system according to an embodiment.

FIG. 3 depicts the information processing system according to the embodiment. The information processing system according to the embodiment, which will be discussed in the first working example, will be described as a computer system including, similarly to the first comparative example illustrated in FIG. 2, the main computer using the plurality of DBs and the sub-computer using the replica DBs.

(Description of System)

A computer system 10 illustrated in FIG. 3 is one example of the information processing system including a main computer 11 equipped with a DB 12 (which is a DB1 in FIG. 3) and a DB 13 (which is a DB2 in FIG. 3), and a sub-computer 21 equipped with a DB 22 (which is a DB1 in FIG. 3) and a DB 23 (which is a DB2 in FIG. 3). Note that in FIG. 3, the DB 12 and the DB 13 of the main computer 11 are noted by "DB1" and "DB2", and the DB 22 and the DB 23 of the sub-computer 21 are noted by "DB1" and "DB2".

The main computer 11 is one example of a first information processing apparatus including a plurality of storage devices, and the sub-computer 21 is one example of a second information processing apparatus including a plurality of storage devices in which a result of an update process to the former plural storage devices is reflected.

The main computer 11 is connected via an unillustrated connection unit to the sub-computer 21. It is to be noted that the connection unit includes a public network such as the Internet, a wireless network such as a mobile phone network, and a LAN (Local area Network).

In the computer system 10 depicted in FIG. 3, the DB 12 and the DB 13 are databases to which the main computer 11 in the task underway refers or databases each used as a storage destination of the data to be managed. Further, DB 22 and the DB 23 are databases to which the sub-computer 21 in the task underway refers or databases each used as a storage destination of the data to be managed. Each DB includes an external storage device such as a solid-state drive and a hard disk drive.

In the computer system 10 illustrated in FIG. 3, the DB 22 equipped in the sub-computer 21 is a replica DB of the DB 12 of the main computer 11, and similarly the DB 23 is a replica DB of the DB 13. Note that the DB 12 and the DB 13 equipped in the main computer 11 and the DB 21 and the DB 22 equipped in the sub-computer 21 may further include, e.g., a plurality of DB groups.

The main computer 11 depicted in FIG. 3 updates the plurality of DBs with one transaction. The matching property related to the update between the DB 12 and the DB 13 is assured by the transaction implemented by the main computer 11. The main computer 11 acquires the journals defined as the update differential data when updating the DBs by distributing the journals on the DB-by-DB basis. Namely, the update differential data of the DB 12 are accumulated in one journal file 16 (which is also written as the journal file 1 in FIG. 3) and thus acquired, while the update differential data of the DB 13 are accumulated in one journal file 17 (which is also written as the journal file 2 in FIG. 3) and thus acquired.

The respective journal files acquired in distribution by the main computer 11 are transferred in parallel to the sub-computer 21 via a predetermined data transferring unit. The journal file 16 transferred to the sub-computer 21 is reflected in the DB 22 defined as the replica DB of the DB 12, and the journal file 17 is reflected in the DB 23 defined as the replica DB of the DB 13. Note that the reflections of the journal files in the sub-computer 21 are executed in parallel.

It is to be noted that the data transferring unit between the main computer 11 and the sub-computer 21 is not limited to the transfer unit if capable of transferring the acquired journal files. The data transferring unit can be exemplified such as a file transfer unit to transfer the acquired update differential data in a lump on a file-by-file basis and a message queue unit to transfer sequentially the update differential data. Further, the data transferring unit may also be a mirroring disk unit to assure the equivalency of the files between the main computer 11 and the sub-computer 21.

Figure 4:
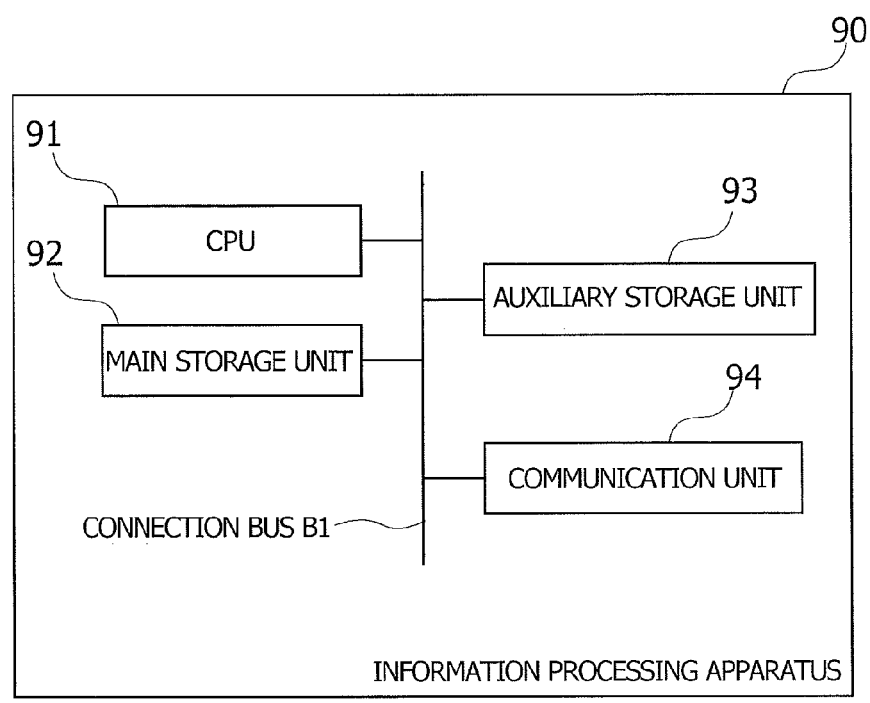
FIG. 4 is a diagram illustrating a hardware configuration of an information processing apparatus.

The main computer 11 and the sub-computer 21 are realized by, e.g., an information processing apparatus 90 operating as a computer, which is illustrated in FIG. 4. FIG. 4 illustrates a hardware configuration of the information processing apparatus 90. The information processing apparatus 90 illustrated in FIG. 4 includes a CPU (Central Processing Unit) 91, a main storage unit 92, an auxiliary storage unit 93 and a communication unit 94, which are connected to each other via a connection bus B1.

In the information processing apparatus 90, the CPU 91 deploys a program stored in the auxiliary storage unit 93 to a operation area of the main storage unit 92 in an execution-enabled mode, and controls peripheral devices through executing the program. The information processing apparatus 90 is thereby enabled to realize functional unit conforming to predetermined purposes. The main storage unit 92 and the auxiliary storage unit 93 are non-transitory recording mediums readable by the information processing apparatus 90 as the computer.

The CPU 91 is a central processing unit that controls the whole information processing apparatus 90. The CPU 91 executes processes according to the programs stored in the auxiliary storage unit 93. The main storage unit 92 is the storage medium on which the CPU 91 caches the programs and the data and deploys the operation area. The main storage unit 92 includes, e.g., a RAM (Random Access Memory) and a ROM (Read Only Memory).

The auxiliary storage unit 93 stores various categories of programs and the various items of data on the recording medium in a readable/writable manner. The auxiliary storage unit 93 is also called an external storage device. The auxiliary storage unit 93 is stored with an Operating System (OS), the various categories of programs, various types of tables, etc. The OS includes a communication interface program for transferring and receiving the data to and from the external devices etc connected via the communication unit 94. The external devices etc include, e.g., other information processing apparatuses and the external storage devices, which are connected via a network etc. Note that the auxiliary storage unit 93 may be configured as a part of a cloud computer system including groups of computers on the network.

The communication unit 94 is, e.g., an interface with the network etc. The communication unit 94 interfaces the main computer 11 with the sub-computer 21 in order to transmit and receive the journal file therebetween.

The auxiliary storage unit 93 is exemplified such as an Erasable Programmable ROM (EPROM), a solid-state drive and a hard disc drive (HDD). Moreover, e.g., a Compact Disc drive (CD), a Digital Versatile Disc (DVD) drive, a Blu-ray Disc (BD) drive can be presented as the auxiliary storage unit 93. The recording medium can be exemplified such as a silicon disc including a non-volatile semiconductor memory (flash memory), a hard disc, a CD, a DVD, a BD and a Universal Serial Bus (USB) memory.

The information processing apparatus 90 illustrated in FIG. 3 may also be configured to include, e.g., an input unit that accepts an operating instruction etc from the user etc. The input unit like this can be exemplified by input devices such as a keyboard and a pointing device. Further, the information processing apparatus 90 may be configured to include an output unit that outputs the data processed by the CPU 91 and the data stored on the main storage unit 92. The output unit like this can be exemplified by output devices such as a Cathode Ray Tube (CRT), a display, an Liquid Crystal Display (LCD), a Plasma Display Panel (PDP), an Electroluminescence (EL) panel, an organic EL panel and a printer.

The CPU 91 reads the OS, the various categories of programs and the various items of data stored on the auxiliary storage unit 93 onto the main storage unit 92 and executes these software components, whereby the information processing apparatus 90 serving as the main computer 11 realizes a journal acquiring device 14 illustrated in FIG. 3 together with executing the target program.

Moreover, the information processing apparatus 90 serving as the main computer 11 includes a transaction sequence number management file 15 referred to by the journal acquiring device 14 or alternatively serving as a storage destination of the data to be managed. The transaction sequence number management file 15 is included in, e.g., the auxiliary storage unit 93.

The CPU 91 reads the OS, the various categories of programs and the various items of data stored on the auxiliary storage unit 93 onto the main storage unit 92 and executes these software components, whereby the information processing apparatus 90 serving as the sub-computer 21 realizes a reflecting device 24 and an excluding device 25 illustrated in FIG. 3 together with executing the target programs.

Further, the information processing apparatus 90 serving as the sub-computer 21 includes a reflection state management file 26 referred to by the excluding device 25 or alternatively serving as a storage destination of the data to be managed. The reflection state management file 26 is included in, e.g., the auxiliary storage unit 93.

(Main Computer)

The journal acquiring device 14 acquires the journals of the respective DBs that are updated with one transaction. The journal acquiring device 14 attaches items of control information such as (1) a transaction sequence number, (2)

an update DB name list and (3) a transaction distribution count to the journal of each DB, thus acquiring the journals of the respective DBs. These items of control information attached by the journal acquiring device 14 are inserted in, e.g., a header field of each of journals.

(1) The transaction sequence number given by the journal acquiring device 14 is number information allocated in a transaction termination sequence. Further, (2) the update DB name list is list information of the DB names of the DBs updated with the transaction. Herein, the DB name is identifying information for uniquely specifying the DB and given by, e.g., the main computer 11. (3) The transaction distribution count is information indicating a distribution count of the journals of the respective DBs updated with one transaction. Note that the transaction sequence number allocated by the journal acquiring device 14 is managed in the transaction sequence number management file 15.

FIGS. 5A and 5B illustrate the journals attached with the predetermined items of control information. The journals in FIGS. 5A and 5B are given by way of examples of the journals updated with "Tran3" depicted in FIG. 3. FIG. 5A illustrates the example of the journals of the DB 12 that are accumulated in the journal file 16, and FIG. 5B depicts the example of the journals of the DB 13 that are accumulated in the journal file 17.

In FIG. 5A, the items of control information such as the transaction sequence number (which is written as "Tran sequence number in FIGS. 5A, 5B), the update DB name list and the transaction distribution count (which is written as "Tran division count in FIGS. 5A, 5B) are inserted in the header field of each of the journals acquired from the update target DB. Note that each of the journals acquired from the target DB contains at least the update DB name and update differential data related to the data update. In the illustrated examples, "3" is given to the "Tran sequence number", "DB1, DB2" are given to the "update DB name list", and "2" is given to the "Tran division count". In FIG. 5B also, the same items of information as those explained in FIG. 5A are inserted.

In the example of FIG. 3, "Tran X" of the main computer 11 represents one transaction, and a length of a solid line connecting small black points indicates a relative period of the transaction related to the update. In the main computer 11 depicted in FIG. 3, the DB 12 is updated with "Tran 1", and the journal A related to the update of the DB 12 is notated by the symbol "black circle". Similarly, the DB 13 is updated with "Tran 2", and a journal P related to the update of the DB 13 is notated by a symbol "triangle". Further, the DB 12 and the DB 13 are updated with "Tran 3", in which a journal B related to the update of the DB 12 is notated by a symbol "black rectangle", and a journal Q related to the update of the DB 13 is notated by a symbol "white rectangle". Still further, "Tran 4" also updates the DB 12 and the DB 13, in which a journal C related to the update of the DB 12 is notated by a symbol "black star", and a journal R related to the update of the DB 13 is noted by a symbol "white start". The transactions demonstrated by the main computer 11 in FIG. 3 are terminated in the sequence such as "Tran 1", "Tran 2", "Tran 3" and "Tran 4".

The journal acquiring device 14 in the embodiment acquires the journals in the way of attaching the items of control information (1) through (3) discussed above to every journal updated with each transaction. For example, the journal updated with "Tran 1" is attached with "1" given to the transaction sequence number, "DB1" given to the update DB name list and "1" given to the transaction distribution count as the items of control information. Further, the journal updated with "Tran 3" is attached with "3" given to the transaction sequence number, "DB1, DB2" given to the update DB name list and "2" given to the transaction distribution count as the items of control information.

Thus, in the main computer 11 of the embodiment, the journal acquiring device 14 attaches the predetermined items of control information to the journals and acquires the journals. The acquired journals are aggregated into the journal file on the DB-by-DB basis. As a result, the journal file 16 contains the journals which are related to the update of the DB 12 and arranged in time-series in the transaction termination sequence, and the journal file 17 contains the journals which are related to the update of the DB 13 and arranged in time-series in the transaction termination sequence.

(Sub-Computer)

The reflecting device 24 reflects, in the replica DB, the journals of each journal file transferred via the data transferring unit. The reflecting device 24 acquires the control information per journal of those aggregated into each journal file, and requests the excluding device 25 for a predetermined excluding process related to updating the journals between the replica DBs.

The excluding device 25 executes an exclusion starting process and an exclusion canceling process throughout the replica DBs on the occasion of reflecting the journals at the update time in the replica DBs. Moreover, the excluding device 25 carries out a process of assuring a transaction execution sequence of the transactions distributed to the plurality of journal files.

Note that the journal reflection state with respect to the whole replica DBs is managed by the reflection state management file 26. Furthermore, the journal reflecting processes with respect to the DB 22 and the DB 23 are executed in parallel by the reflecting device 24 and the excluding device 25 according to the embodiment.

In the example of FIG. 3, "Tran X (X takes values 1, 2, 3, 4)" of the sub-computer 21 represents one transaction reflected in the replica DB, and a length of a solid line connecting small black points indicates a relative period of the transaction related to the update. Note that in the illustrated example, "Reflection1" represents a process of reflecting the journals in the DB 12 that are aggregated into the journal file 16, and "Reflection2" represents a process of reflecting the journals in the DB 13 that are aggregated into the journal file 17. The process of reflecting the journals in the DB 12, which are aggregated into the journal file 16, is executed for the DB 22 as a target database defined as the replica DB of the DB 12. Moreover, the process of reflecting the journals in the DB 13, which are aggregated into the journal file 17, is executed for the DB 23 as a target database defined as the replica DB of the DB 13.

The sub-computer 21 in the embodiment functions so that the reflecting device 24 and the excluding device 25 assure the matching property with the transaction implemented by the main computer 11. In the sub-computer 21 of the embodiment, the reflecting device 24 and the excluding device 25 obviate the mismatching of the transaction between the replica DBs, which occurs in the mode illustrated in FIG. 2 according to the first comparative example.

It is to be noted that the mismatching occurring in the mode illustrated in FIG. 2 according to the first comparative example is assumed to occur in the following two cases. The mismatching in a first case occurs when an occurrence sequence of the journals contained in each journal file transferred to the sub-computer 21 from the main computer 11 is the same as an update reflection sequence with respect to the replica DBs. The mismatching in a second case occurs when the occurrence sequence of the journals contained in each journal file transferred to the sub-computer 21 from the main computer 11 is different from the update reflection sequence with respect to the replica DBs. A function of the sub-computer 21 of the embodiment will be described corresponding to the case 1 and the case 2, respectively.

(Case 1)

Figure 6:
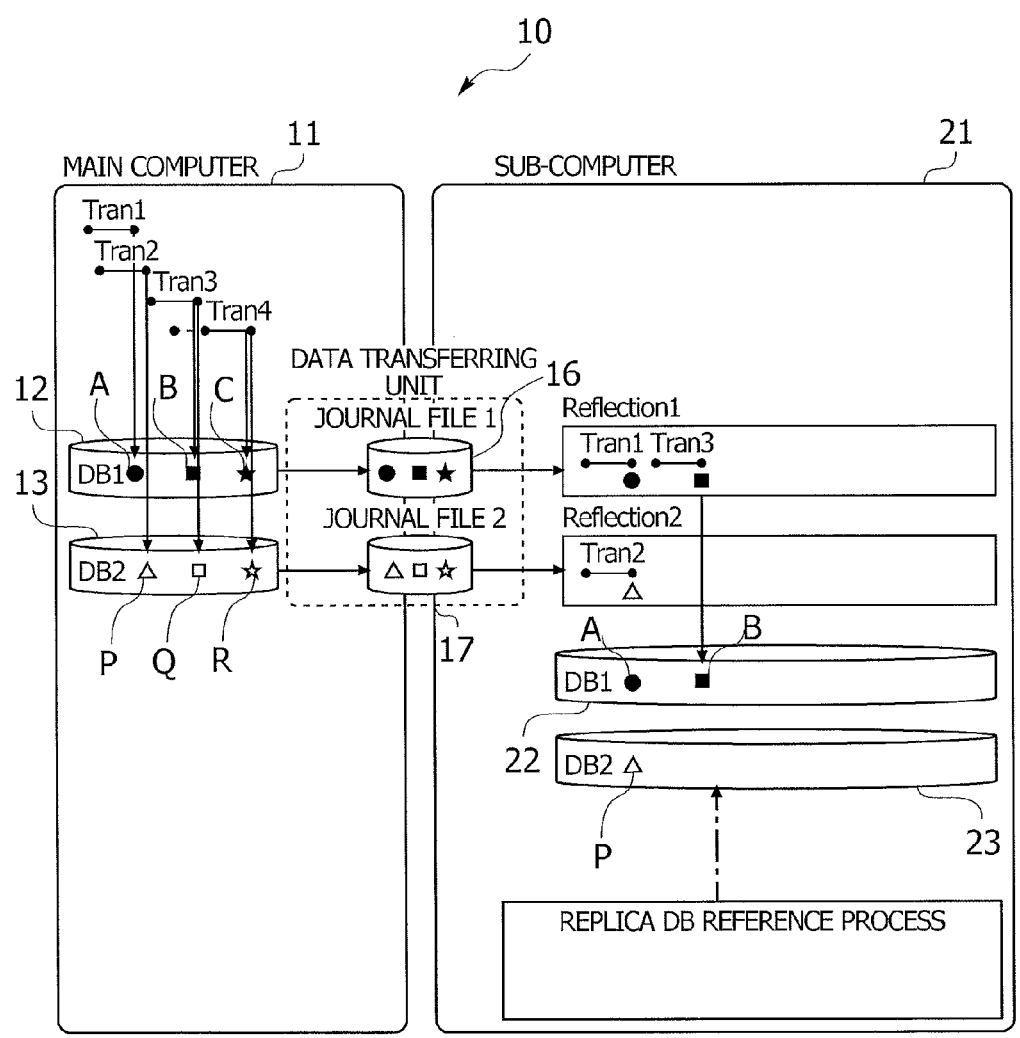
FIG. 6 is an explanatory diagram of mismatching of a transaction between replica DBs in a case 1.

FIG. 6 illustrates an explanatory diagram of the mismatching of the transaction between the replica DBs, which occurs in the mode illustrated in FIG. 2 according to the first comparative example. FIG. 6 illustrates the case of mismatching of the transaction between the replica DBs, which occurs when the occurrence sequence of the journals contained in each journal file transferred to the sub-computer 21 from the main computer 11 is the same as the update reflection sequence with respect to the replica DBs. A relation between "TranX" and the journal in each DB of the main computer 11 in FIG. 6 goes as described about the main computer 11 in FIG. 3. Further, a relation between "ReflectionX" and "JournalFileX" of the sub-computer 21 in FIG. 6 goes as described about the sub-computer 21 in FIG. 3. Note that the same relation as in FIG. 6 is applied to FIGS. 7 through 9 in the following discussion.

In "Tran3" of the main computer 11 depicted in FIG. 6, the DB 12 and the DB 13 are updated with one transaction. The journals of the respective DBs updated in "Tran3" of the main computer 11 are distributed into the journal files on the DB-by-DB basis and thus transferred to the sub-computer 21. The sub-computer 21 reflects the journal files distributed on the DB-by-DB basis in the replica DBs in parallel. In the mode illustrated in FIG. 2 according to the first comparative example, however, the update process is carried out per distributed journal file, and hence there is no assurance to update together the journal B updated with "Reflection1" and notated by the symbol "black rectangle" and the journal Q updated with "Reflection2" and notated by the symbol "white rectangle".

For example, as depicted in FIG. 6, the reflection of "Tran3" is terminated with "Reflection1", and, even when the journal B with respect to the DB 22 defined as the replica DB is updated, "Tran3" of "Reflection2" does not finish, and such a status can arise that the journal Q with respect to the DB 23 is not reflected. Thus, in the mode illustrated in FIG. 2 according to the first comparative example, the sub-computer 21 can refer to the replica DB as triggered by terminating "Tran3" of "Reflection1". Therefore, it follows that the sub-computer 21 refers to the data in which "Tran3" is reflected with respect to the DB 22 and refers to the data in which "Tran2" is reflected with respect to the DB 23. For instance, the DB 22 is a "stock DB", and the DB 23 is a "sales DB", in which case the mismatching between the replica DBs occurs such that a sales count in the "sales DB" increases, while a stock count in the "stock DB" does not decrease.

In the sub-computer 21 of the computer system 10 according to the embodiment, the reflecting device 24 the excluding device 25 assure the matching property of the transactions related to updating the journals between the replica DBs, which is executed in parallel. The sub-computer 21 according to the embodiment assures the matching property between the replica DBs with respect to the transactions distributed to the plurality of journal files on the basis of the items of control information attached to the respective journals.

Figure 7:
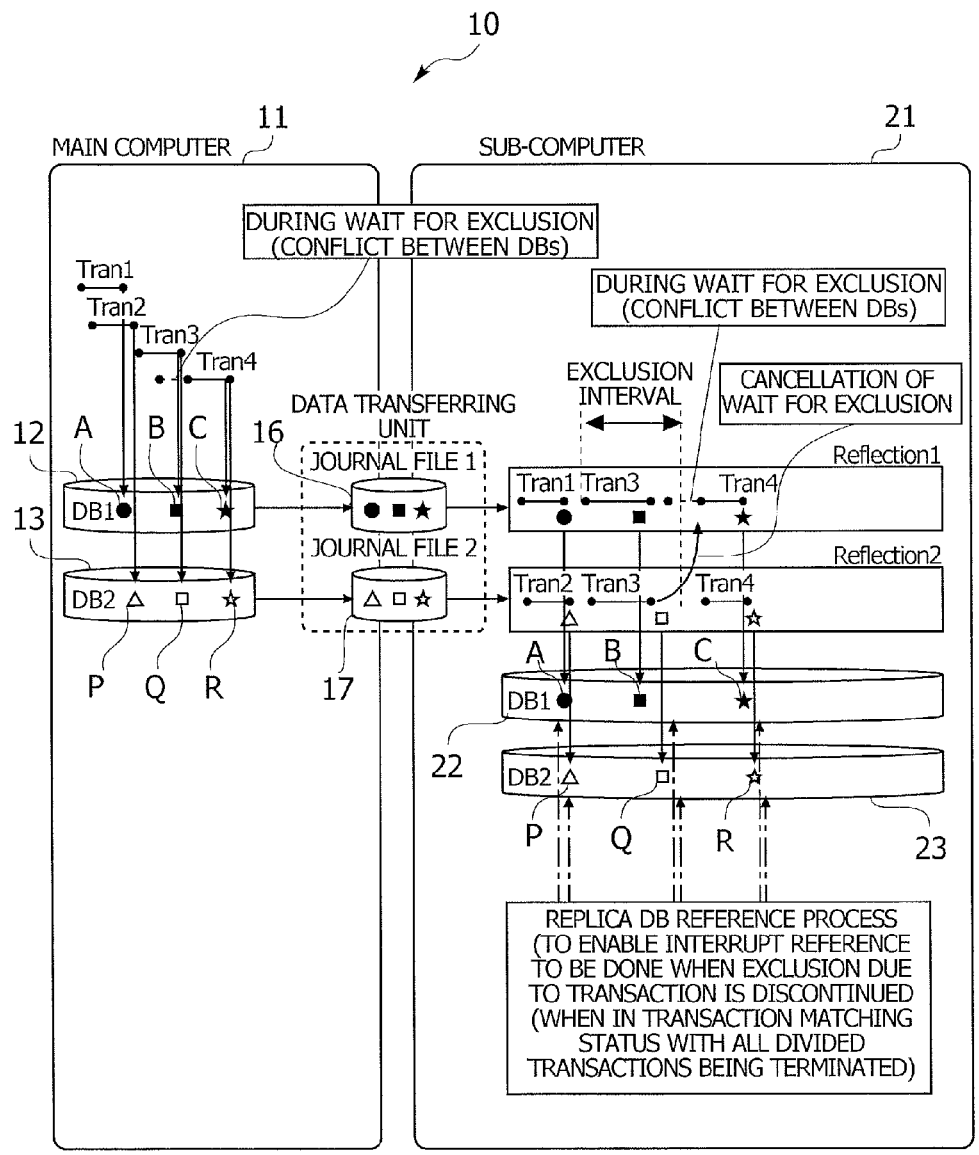
FIG. 7 is an explanatory diagram of a matching property of the transaction between replica DBs in the embodiment.

FIG. 7 is an explanatory diagram of the matching property between the replica DBs of the transactions in the sub-computer 21 according to the embodiment. The journals updated with the respective transactions are arranged in time-series in the transaction termination sequence in the journal file 16 of the DB 12 of the main computer 11. The journal A of "Tran1", the journal B of "Tran3" and the journal C of "Tran4" are arranged in the journal file 16 in FIG. 7. Similarly, the journal P of "Tran2", the journal Q of "Tran3" and the journal R of "Tran4" are arranged in the journal file 17 of the DB 13 of the sub-computer 21.

As indicated in "Reflection1" in FIG. 7, it follows that the respective journals of the journal file 16 are updated in the sequence such as the journal A, the journal B and the journal C owing to an exclusion control function of the transaction executed by the sub-computer 21. This is because the transactions using the same DB have a conflict about the target DB between the two transactions, and a subsequent process waits (exclusion wait) for an end of a precedent process under the exclusion control of the transaction. To be specific, in "Reflection1" in FIG. 7, "Tran3" waits for an end of "Tran1", and "Tran4" waits for an end of "Tran2". As a result, in the update process of "Reflection1" on the sub-computer 21, the sequence of the journals aggregated into the journal file 16 is assured. Similarly, as indicated by "Reflection2" in FIG. 7, the respective journals of the journal file 17 are updated in the sequence such as the journal P, the journal Q and the journal R owing to the exclusion control function of the transaction executed by the sub-computer 21.

The sub-computer 21 according to the embodiment executes the exclusion control between the replica DBs in the update-reflection transactions targeting on the plurality of replica DBs. Specifically, in "Tran3" of FIG. 7, the update target DB 22 and DB 23 are excluded at a start of the precedent transaction of "Reflection1", while there is cancelled the exclusion of the update target DB 22 and DB 23 excluded at an end of the subsequent transaction with "Reflection2". The exclusion control between these replica DBs is performed, whereby it follows that the replica DBs are referred to after an elapse of an "exclusion interval" depicted in FIG. 7, and the mismatching between the replica DBs explained in FIG. 6 is avoided. Namely, the journal B is reflected in the DB 22, and the journal Q is reflected in the DB 23, to which the sub-computer 21 according to the embodiment refers, and hence the matching property of the transactions distributed to the plurality of journals is assured.

(Case 2)

Figure 8:
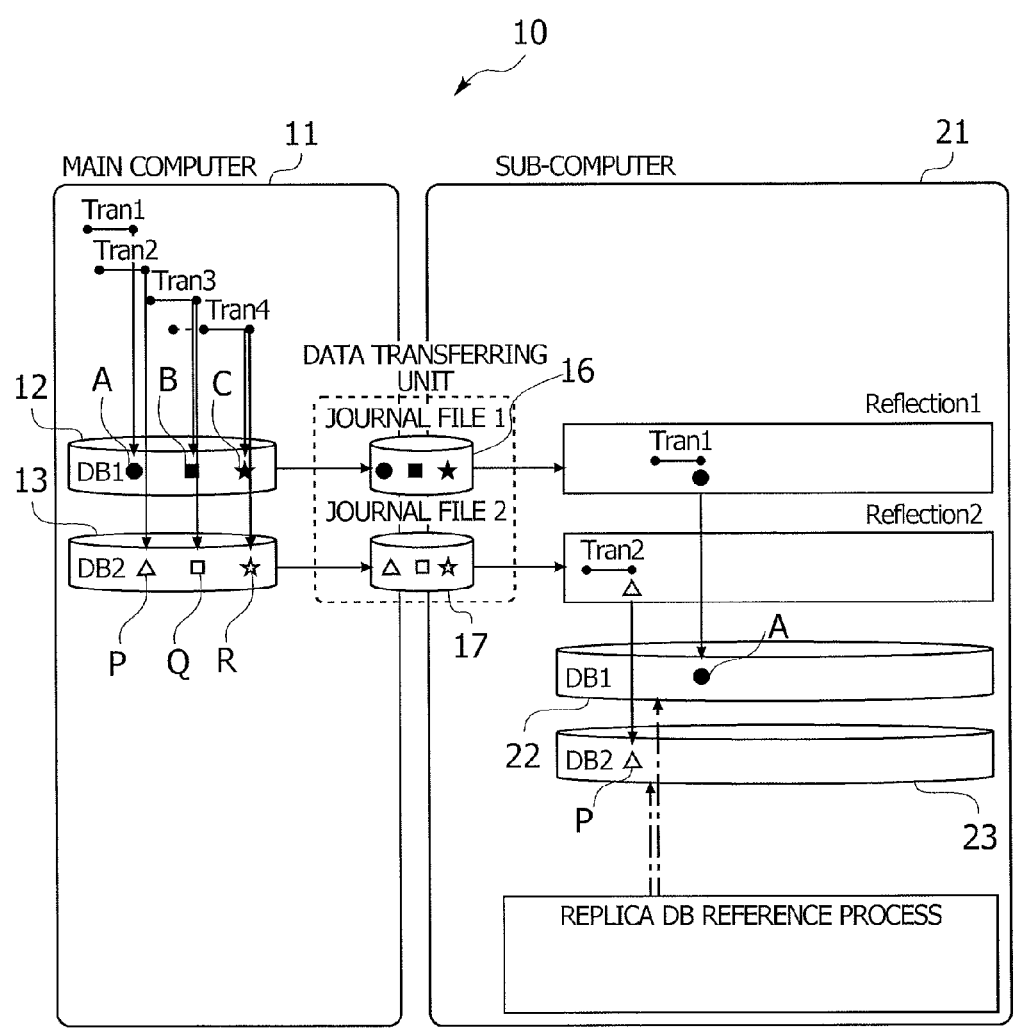
FIG. 8 is an explanatory diagram of the mismatching of the transaction between the replica DBs in a case 2.

FIG. 8 illustrates an explanatory diagram of the mismatching of the transaction between the replica DBs, which occurs in the mode illustrated in FIG. 2 according to the first comparative example. FIG. 8 illustrates a case of the mismatching of the transaction between the replica DBs, which occurs when the occurrence sequence of the journals contained in the respective journal files transferred to the sub-computer 21 from the main computer 11 is different from the update sequence with respect to the replica DBs.

In the relation between "Tran1" and "Tran2" on the main computer 11 illustrated in FIG. 8, "Tran2" is updated after updating "Tran1". The journals of the DB 12 updated with "Tran1" are distributed into the journal file 16, while the journals of the DB 13 updated with "Tran2" are distributed into the journal file 17, thus transferring the journal files 16, 17 to the sub-computer 21. The journal files 16, 17 transferred in distribution to the sub-computer 21 are reflected in the replica DBs in parallel.

In the mode illustrated in FIG. 2 according to the first comparative example, however, the update process is carried out per distributed journal file, and hence there is no assurance to update the journal P of "Reflection2" after updating the journal A of "Reflection1". For example, as depicted in FIG. 8, such a status can arise that the update of "Tran2" is finished with "Reflection2", after the journal P has been reflected in the DB 23 defined as the replica DB, the update of "Tran1" is finished with "Reflection1", and the journal A is reflected in the DB 22 defined as the replica DB.

In the mode illustrated in FIG. 2 according to the first comparative example, the sub-computer 21 can refer to the replica DB as triggered by the end of "Tran2" of "Reflection2". Therefore, it follows that the sub-computer 21 refers to the data in a status of "No reflection data" indicating no data reflected with respect to the DB 22 and refers to the data in which "Tran2" is reflected with respect to the DB 23. For instance, on the assumption of a "commercial product DB" and a "stock DB", the stock count of the "stock DB" is set to "0" in "Tran1", and a relevant commercial product in the "commercial product DB" is deleted, in which case such a status occurs that the commercial product is deleted, and nevertheless the stock exists. The mismatching occurs between the replica DBs referred to by the sub-computer 21.

The sub-computer 21 according to the embodiment assures the matching property between the replica DBs about the transaction termination sequence of the transaction distributed to the plurality of journal files on the basis of the items of control information attached to the respective journals.

Figure 9:
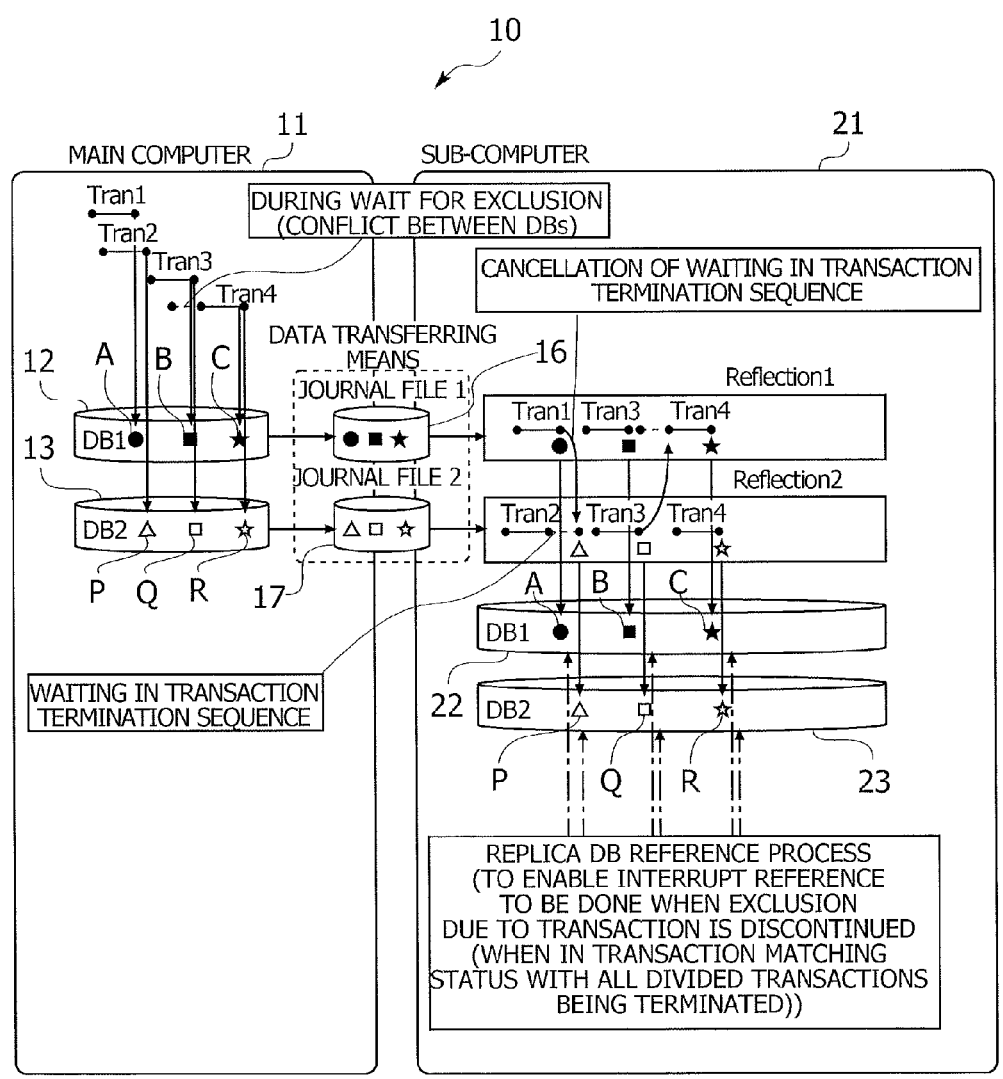
FIG. 9 is an explanatory diagram of the matching property with respect to a transaction termination sequence between the replica DBs in the embodiment.

FIG. 9 is an explanatory diagram of the matching property between the replica DBs about the transaction termination sequence in the sub-computer 21 according to the embodiment. The journal A of "Tran1", the journal B of "Tran3" and the journal C of "Tran4" are arranged in the journal file 16 in FIG. 9. Similarly, the journal P of "Tran2", the journal Q of "Tran3" and the journal R of "Tran4" are arranged in the journal file 17 of the DB 13 in the transaction termination sequence.

In "Reflection1" in FIG. 9, the respective journals of the journal file 16 are updated in the sequence such as the journal A, the journal B and the journal C owing to the exclusion control function of the transaction executed by the sub-computer 21. Similarly, in "Reflection2" in FIG. 9, the respective journals of the journal file 17 are updated in the sequence such as the journal P, the journal Q and the journal R owing to the exclusion control function of the transaction executed by the sub-computer 21.

The sub-computer 21 according to the embodiment reflects the transactions distributed to the journal files in the same sequence as the transaction termination sequence of the main computer 11. In the relation between "Tran1" of "Reflection1" and "Tran2" of "Reflection2" as illustrated in FIG. 9, the update process of "Tran2" precedes. In the sub-computer 21 according to the embodiment, "Tran2" preceding in terms of the update process waits for the termination of the transaction related to the update process of "Tran1" of "Reflection1" that is earlier in terms of the transaction termination sequence. That is, in "Tran2" preceding in terms of the update process between the replica DBs, the journal reflection of "Tran2" is terminated after finishing the journal reflection of "Tran1".

Thus, the sub-computer 21 can assure the matching property between the replica DBs by performing the transaction termination sequence wait control of the transactions related to the update reflection between the replica DBs. In the sub-computer 21 according to the embodiment, the replica DB is referred to as triggered by the termination of "Tran2" of "Reflection2", the mismatching is not caused between the replica DBs explained in FIG. 8. In the sub-computer 21, the journal A is reflected in the DB 22 referred to as triggered by the termination of "Tran2" of "Reflection2", and the journal P is reflected in the DB 23. The sub-computer 21 according to the embodiment can assure the matching property between the replica DBs with respect to the transaction termination sequence of the transactions distributed to the plurality of journal files.

Note that in the case 2 described above, when updating the DB 12 and the DB 13 by one transaction, i.e., "Tran2" of the main computer 11 illustrated in FIG. 9, a deadlock might occur in the transaction of the update reflection on the sub-computer 21.

When updating the DB 12 and the DB 13 by "Tran2" of the main computer 11, there is no change in the journal sequence of the journal file 17. However, it follows that the journals with respect to the DB 12 are arranged in the sequence such as "Tran1", "Tran2", "Tran3" and "Tran4" in the journal file 16. Accordingly, when "Tran2" precedes in "Reflection2" as in FIG. 9, "Tran2" sets the plurality of replica DBs as the update targets, and hence the exclusion control between the DBs is executed. Namely, "Tran2" of "Reflection2" is started, resulting in excluding the DB 22 as the update target of "Tran2" of "Reflection1".

In the DB 22 excluded by the start of "Tran2" of "Reflection2", "Tran1" of "Reflection1" comes to the status of waiting for cancelling the exclusion of "Tran2" by "Reflection2" or "Reflection1". On the other hand, a deadlock state might occur in "Tran2" of "Reflection2" because of becoming the status of waiting for termination of the transaction in "Tran1" of "Reflection1", which is earlier in the transaction termination sequence.

The sub-computer 21 according to the embodiment functions to prevent the deadlock even in such a case that the transaction of the update reflection that is executed in advance targets on the plurality of replica DBs and waits for the termination of another transaction.

To be specific, the sub-computer 21 according to the embodiment checks whether or not there is the status of waiting for cancelling the exclusion of "Reflection1" on the occasion of terminating "Tran2" of "Reflection2" that is precedent between the replica DBs. Then, the sub-computer 21, if the transaction waiting for cancelling the exclusion of "Reflection1" is the transaction that is earlier in terms of the termination sequence in the main computer 11, cancels the transaction related to "Tran2" of "Reflection2" and rolls back this transaction. The sub-computer 21 according to the embodiment can, simultaneously with the rollback of the transaction related to "Tran2" of "Reflection2", canceling the wait for the cancellation of the exclusion of "Reflection2", and can also start the operation of processing "Tran1" of "Reflection1". Thus, the sub-computer 21 according to the embodiment can prevent the deadlock from being caused between the replica DBs.

(Processing Flow)
(Computer System)

Figure 10A:
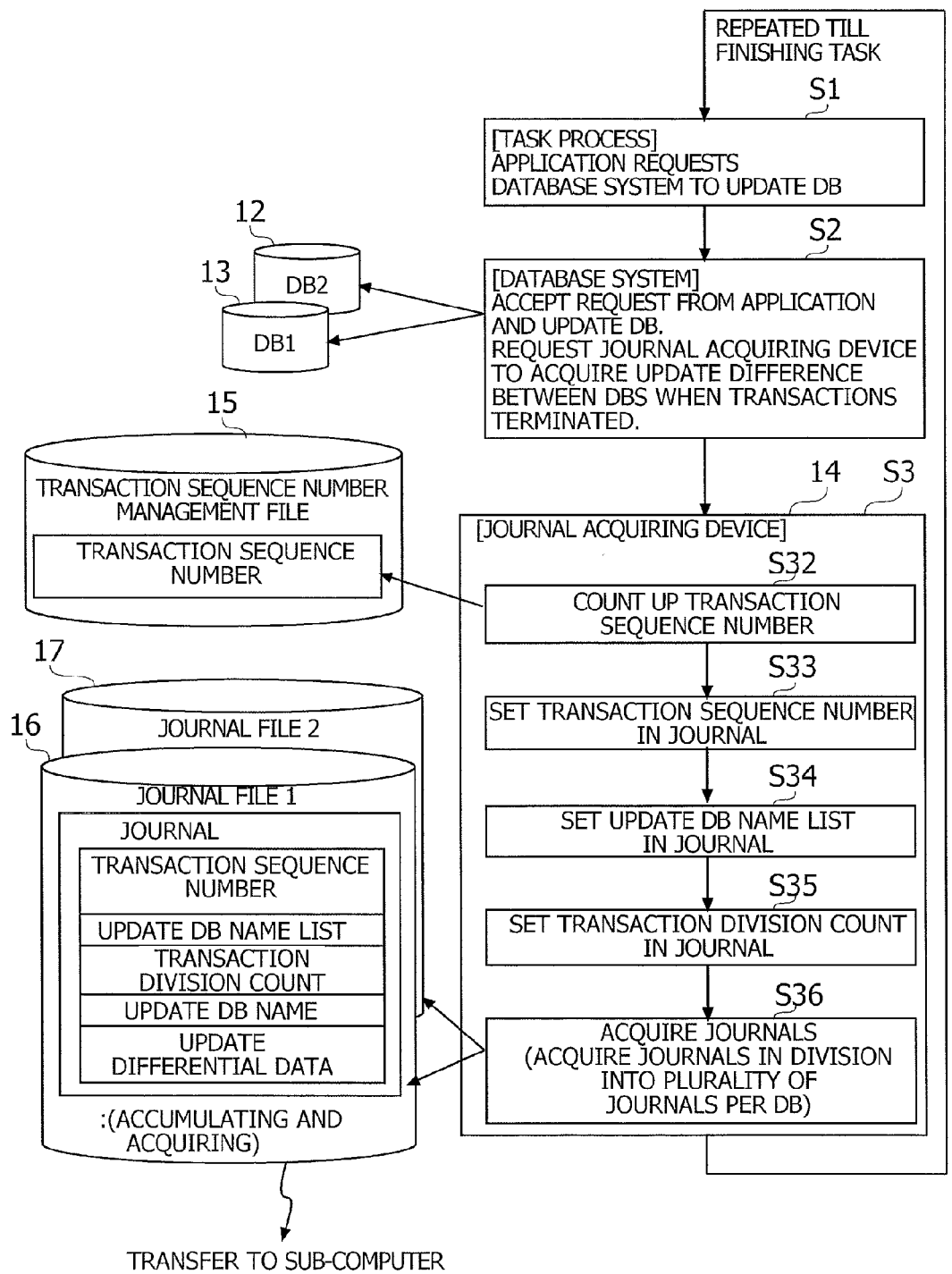
FIG. 10A is a flowchart illustrating processes of the information processing system.
Figure 10B:
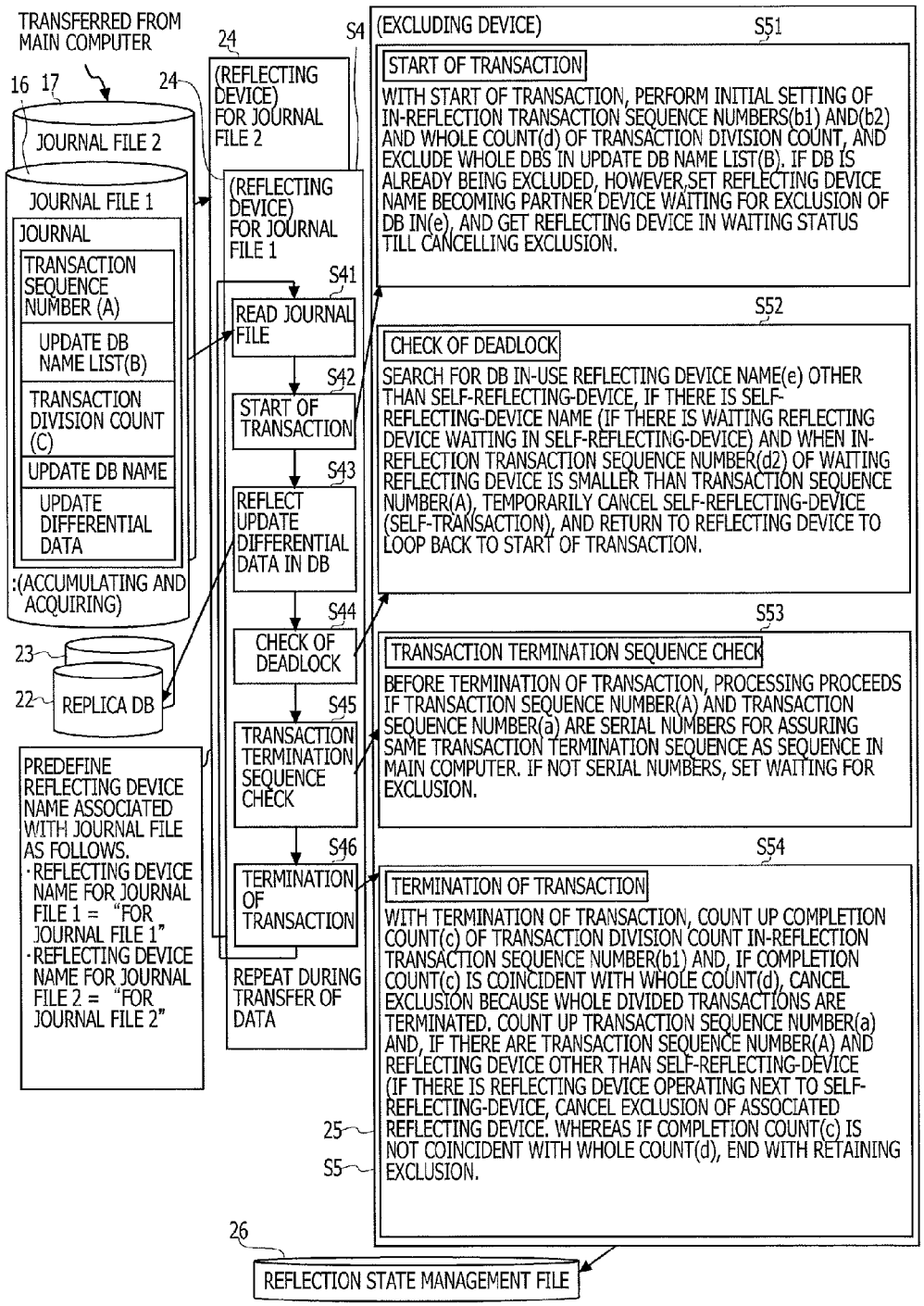
FIG. 10B is a flowchart illustrating the processes of the information processing system.

The processes of the computer system 10 according to the embodiment will hereinafter be described with reference to FIGS. 10 through 18. FIGS. 10A and 10B illustrate flowcharts of the processes of the computer system 10. The processes illustrated in FIG. 10A are executed by the main computer 11 of the computer system 10. The processes illustrated in FIG. 10B are executed by the sub-computer 21 of the computer system 10. The main computer 11 executes the processes illustrated in FIG. 10A on the basis of the computer program deployed to, e.g., the main storage unit 92 in an execution-enabled mode. Similarly, the sub-computer 21 executes the processes illustrated in FIG. 10B on the basis of the computer program deployed to, e.g., the main storage unit 92 in an execution-enabled mode.

In the flowchart depicted in FIG. 10A, the processes in S1-S3 are repeatedly executed for a period till finishing the task of the computer system 10. The processes in S1-S3 are executed by the main computer 11.

To start with, the application of the main computer 11 executing the task process, if the update occurs in the DB referred to by the sub-computer 21 in the task underway or alternatively used as the storage destination of the data to be managed, requests the database system to update the respective DBs (S1). The database system includes the DB 12 (which is notated by "DB1" within a symbol image of the database in FIG. 10A) and the DB 13 (which is notated by "DB2" within the symbol image of the database in FIG. 10A). For instance, a Database Management System (DBMS) for managing the database system accepts an update request from the main computer 11 and updates the DB with one transaction. If a plurality of update target DBs exists, the DBMS updates the plurality of target DBs with one transaction. Then, as triggered by the termination of the transaction related to updating the DB, the DBMS requests the journal acquiring device 14 to acquire the update differential data (journal) of the update target DB (S2).

In S3, the journal acquiring device 14 attaches the items of control information to the journal (S33-S35) and acquires the journal related to the update (S36). The items of control information attached to the journal contain the transaction sequence number, the update DB name list and the transaction division count. Note that the transaction sequence number is managed in the transaction sequence number management file 15 (S32). A detailed process in S3 will be described later on in FIG. 11.

The journal acquiring device 14 according to the embodiment distributes the acquired journals to the journal files on the DB-by-DB basis, thus obtaining the journal files. In the embodiment, the journals in the DB 12 are aggregated into the journal file 16 (which is also referred to as the journal file 1 in FIGs.) and thus acquired, while the journals in the DB 13 are accumulated into the journal file 17 (which is also referred to as the journal file 2 in FIGs.) and thus acquired. Note that the journal files may be grouped by accumulating the journals on a per DB group basis in the case of DBs being sorted into DB groups (DB Groups). The journal files 16, 17 distributed on the DB-by-DB basis and thus accumulated by the journal acquiring device 14 are transferred to the sub-computer 21 via the data transferring unit.

In accordance with the flowchart illustrated in FIG. 10B, the sub-computer 21 of the computer system 10 executes a journal reflecting process with respect to the replica DB on the basis of the transferred journal files. The reflecting process executed by the sub-computer 21 is carried out based on the plurality of distributed journal files in parallel to the target replica DBs. The processes depicted in FIG. 10B are executed as triggered by, e.g., an arrival of the journal files transferred from the main computer 11.

Note that in FIG. 10B, the journal files are transferred in distribution on the DB-by-DB basis (or on a per DB group basis), and hence the reflecting process executed by the reflecting device 24 is exemplified in the way of being associated with every journal file. In the example of FIG. 10B, the reflecting process of the journal file 16 (which is the journal file 1 in FIGs.), which is executed by the reflecting device 24, is expressed as a process "for the journal file 1". Similarly, in the example of FIG. 10B, the reflecting process of the journal file 17 (which is the journal file 2 in FIGs.), which is executed by the reflecting device 24, is expressed as a process "for the journal file 2".

In the flowchart depicted in FIG. 10B, the reflecting process executed as the process "for the journal file 2" is the same as the reflecting process executed as the process "for the journal file 1". Accordingly, in the following discussion, the reflecting process executed by the reflecting device 24 is to be described by way of an example of the process "for the journal file 1", and the process "for the journal file 2" is properly explained.

In the flowchart depicted in FIG. 10B, the processes in S4-S5 are repeatedly executed during a transfer of the journal files from the main computer 11 of the computer system 10. In the flowchart illustrated in FIG. 10B, the process in s4 is executed by the reflecting device 24, while the process in s5 is executed by the excluding device 25.

In S41 depicted in FIG. 10B, for instance, the reflecting process "for the journal file 1" of the reflecting device 24 involves reading the journal as triggered by an arrival of the journal file 16 transferred in distribution. The reflecting process "for the journal file 1" of the reflecting device 24 involves acquiring the journal processed as targeting on the DB 12 of the main computer 11 from the journal file 16. The plurality of journals is accumulated in the journal file 16 in the transaction termination sequence of the transactions related to the update implemented by the main computer 11.

Similarly, the reflecting process "for the journal file 2" of the reflecting device 24 involves reading the journal as triggered by the arrival of the journal file 17 transferred in distribution. The reflecting process "for the journal file 2" of the reflecting device 24 involves acquiring the journal processed as targeting on the DB 13 of the main computer 11 from the journal file 17. The plurality of journals is accumulated in the journal file 17 in the transaction termination sequence of the transactions related to the update implemented by the main computer 11.

Note that if the plurality of journal files is transferred, the reflecting process "for the journal file 1" of the reflecting device 24 and the reflecting process "for the journal file 2" are executed in parallel.

Next, the reflecting process "for the journal file 1" of the reflecting device 24 involves requesting the excluding device 25 for a transaction starting process ("start of transaction" in FIGs.) on the basis of the journals read in S41 (S42). Then, the reflecting process "for the journal file 1" of the reflecting device 24 involves executing the journal reflecting process with respect to the target replica DB (S43). Next, the reflecting process "for the journal file 1" of the reflecting device 24 involves executing a predetermined processing request for the excluding device 25 in order to ensure the matching property between the replica DBs becoming the target DBs for the journal reflecting process (S44-S46). The predetermined processing request for the excluding device 25 includes a dead lock checking process (S44) of the replica DBs becoming the target DBs of the journal reflecting process and a transaction termination sequence checking process (S45, "transaction termination sequence check" in FIGs.). The predetermined processing request for the excluding device 25 further includes a transaction terminating process (S46, "termination of transaction" in FIGs.) with respect to, e.g., the journal being processed underway. Detailed processes of the reflecting device 24 will be described later on in FIG. 12.

In the flowchart illustrated in FIG. 10B, the process of the excluding device 25 in S5 is executed as triggered by receiving a request from the reflecting device 24. In S51, the excluding device 25 executes a transaction starting process ("start of transaction" in FIGs.) in response to the request of the reflecting device 24 in S42. In the transaction starting process, the excluding device 25, with the start of the transaction in the reflecting process, performs an initial setting of a storage value in the reflection state management file 26 on the basis of the control information attached to the journal in order to assure the matching property between the replica DBs. Moreover, the excluding device 25 conducts exclusion control of the journal reflecting process with respect to each replica DB in order to assure the matching property between the replica DBs of the transactions distributed to the plurality of journal files. Under the exclusion control in S51, e.g., exclusion setting and exclusion-cancellation of the reflecting process are carried out based on the storage values in the management table stored in the reflection state management file 26. An in-depth description of the transaction starting process in S51 will be made later on in FIG. 13.

FIGS. 5C, 5D and 5E illustrate the management tables stored in the reflection state management file 26. FIG. 5C illustrates an example of the management table stored with information for assuring the transaction termination sequence related to the DB update process executed by the main computer 11. The management table illustrated in FIG. 5C contains a "reflection completion transaction sequence number" field. In the management table illustrated in FIG. 5C, e.g., the transaction sequence number with the reflecting process being completed in the transaction termination process of the excluding device 25 in S54 is stored in the "reflection completion transaction sequence number" field. In FIG. 5C, the transaction sequence number stored therein is a transaction sequence number of the journal undergoing the reflecting process underway. In the management table illustrated in FIG. 5C, the transaction sequence number of the target journal is stored in the "reflection completion transaction sequence number" field every time the reflecting process is completed.

FIG. 5D illustrates an example of the management table stored with information for continuing to retain the exclusion between the transactions distributed to the plurality of journal files. The management table illustrated in FIG. 5D contains a record per reflecting process of the journal file, which is executed by the reflecting device 24. The management table illustrated in FIG. 5D contains an "in-reflection transaction sequence number" field and a "transaction division count" field, in which the "transaction division count" field contains a "completion count" field and a "whole count" field. The transaction sequence number being reflected at the present is stored in the "in-reflection transaction sequence number" field. A distribution count of the transactions distributed to the plurality of journal files is stored in the "whole count" field of the "transaction division count" field. A numeric value with the reflecting process being completed in the transactions distributed to the plurality of journal files is stored in the "completion count" field of the "transaction division count" field.

FIG. 5E illustrates an example of the management table stored with information for avoiding the deadlock between the transactions and information for canceling a sequence waiting status of the transaction waiting for execution in the excluding process. The management table illustrated in FIG. 5E contains a record per reflecting process of the journal file, which is executed by the reflecting device 24. The management table illustrated in FIG. 5E contains a "reflecting device name" field, an "in-reflection transaction sequence number" field and a "DB in-use reflecting device name" field. The "reflecting device name" field is stored with a reflecting device name per distributed journal file. In the illustrated example, values such as "for journal file 1" and "journal file 2" are each stored therein as "reflecting device name". The transaction sequence number being reflected at the present is stored in the "in-reflection transaction sequence number" field. The reflecting device name of the reflecting device using the target DB in the reflecting process of the reflecting device, which is stored in the "reflecting device name" field, is stored in the "DB in-use reflecting device name" field. Namely, the reflecting device name of the reflecting device waiting for the exclusion is stored in this field.

Referring back to the flowchart illustrated in FIG. 10B, in S52, the excluding device 25 executes the deadlock checking process ("check of deadlock" in FIGs.) in response to a request of the reflecting device 24 in S44. The excluding device 25 executes the deadlock checking process about the transaction related to the reflecting process being executed underway on the basis of the formation stored in the reflection state management file 26. An in-depth description of the deadlock checking process in S52 will be made later on in FIG. 14.

In S53, the excluding device 25 executes a transaction termination sequence checking process ("transaction termination sequence check" in FIGs.) in response to a request of the reflecting device 24 in S45. The excluding device 25 executes the transaction termination sequence checking process of the transaction undergoing the reflecting process underway on the basis of the information stored in the reflection state management file 26 in order to assure the transaction termination sequence in the main computer 11. The transaction termination sequence checking process in S53 will be described in detail later on in FIG. 15.

In S54, the excluding device 25 executes a transaction termination process ("termination of transaction" in FIGs.) in response to a request of the reflecting device 24 in S46. The excluding device 25 executes the termination process of the transaction in the reflecting process underway on the basis of the information stored in the reflection state management file 26. Details of the transaction termination procedure in S54 will be described later on in FIG. 16.

(Main Computer)

Figure 11:
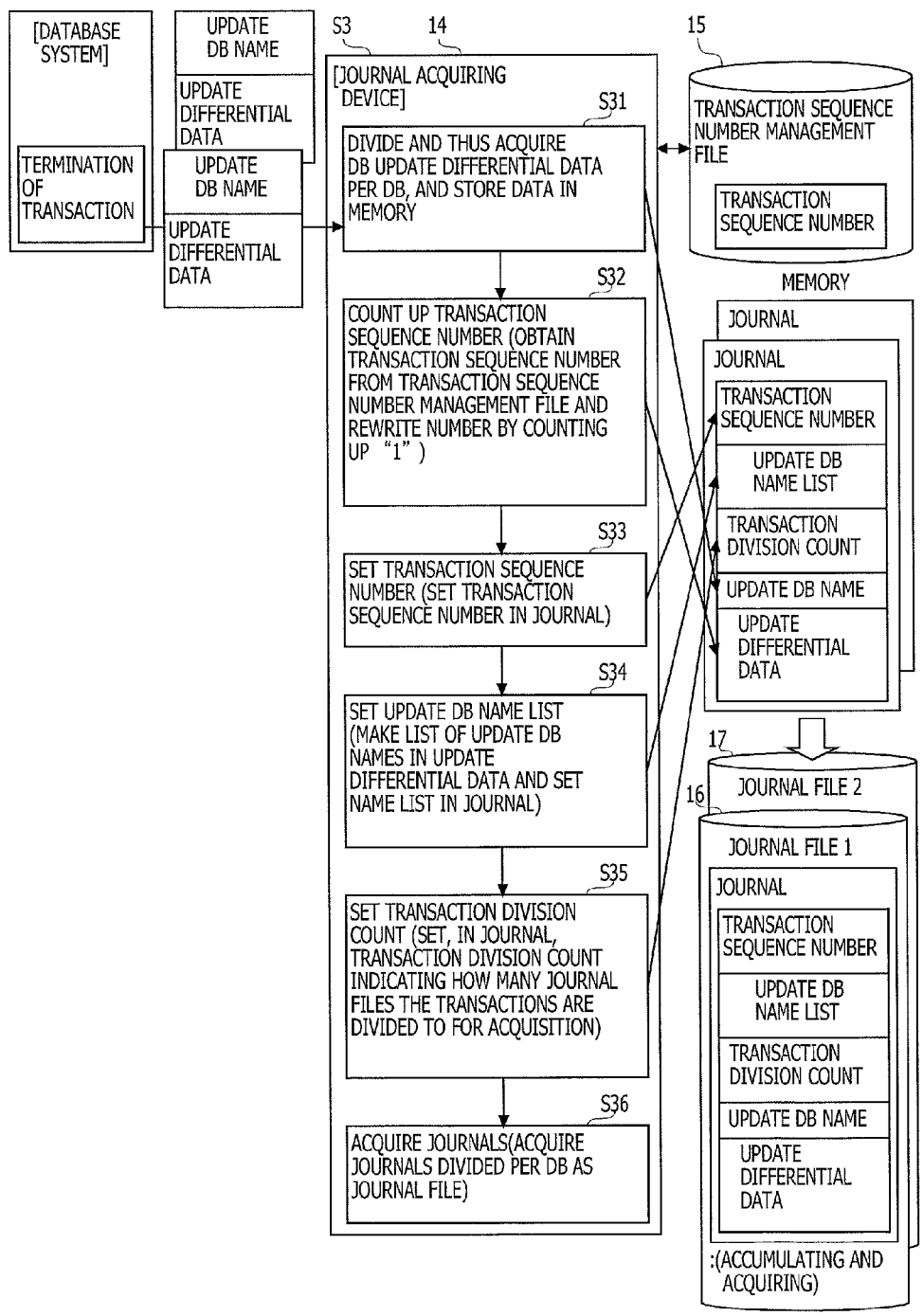
FIG. 11 is a flowchart illustrating a detailed process in S3.

FIG. 11 illustrates a detailed flowchart of the journal acquiring device 14 (S3 in FIG. 10A). The process in S3 illustrated in FIG. 11 is executed, e.g., every time the transaction is terminated. In the flowchart depicted in FIG. 11, the journal acquiring device 14 of the main computer 11 acquires the update differential data updated with one transaction in a way that distributes the data on the DB-by-DB basis (S31). The journal acquiring device 14 temporarily stores the acquired journals per DB in a predetermined area of the main storage unit 92 of the main computer 11 and shifts to S32.

Through the process in, e.g., S31, in "Tran1" of FIG. 3, the journals updated with the transaction in the DB 12 are acquired. Further, in "Tran3" of FIG. 3, there are acquired the journals updated in the DB 12 and the journals updated in the DB 13.

In S32, the journal acquiring device 14 executes counting up the transaction sequence number ("transaction sequence number" in FIGs.) stored in the transaction sequence number management file 15. The journal acquiring device 14 acquires a storage value of the transaction sequence number stored in the transaction sequence number management file 15, and stores temporarily this value in the predetermined area of the main storage unit 92. Moreover, the journal acquiring device 14 increments the acquired storage value by "1", then stores the incremented value in the transaction sequence number management file 15, and shifts to S33.

For example, in the process of S32, in "Tran1" of FIG. 3, the journal acquiring device 14 acquires "1" defined as the transaction sequence number stored in the transaction sequence number management file 15, and temporarily stores "1" in the predetermined area of the main storage unit 92. Then, the journal acquiring device 14 stores "2" obtained by incrementing the acquired transaction sequence number by "1" in the transaction sequence number management file 15. Subsequently, in next "Tran2", the value "2" defined as the transaction sequence number counted up in "Tran1" is read. Namely, it follows that "X+1" defined as the transaction sequence number counted up in S32 of "TranX" is read in the process of the next transaction in S32.

Herein, the transaction sequence number of which numbering is applied by the journal acquiring device 14 is one example of the sequence number indicating the update process termination sequence.

In S33, the journal acquiring device 14 sets the transaction sequence number acquired in S32 in the journal obtained in S31, and shifts to S34. In S34, the journal acquiring device 14 extracts the update DB name from the journal acquired in S31, attaches the extracted DB name to the update DB name list, then sets the update DB name list attached with the extracted DB name in the journal acquired in S31, and shifts to S35. In S35, the journal acquiring device 14 sets the distribution count of the journal files in the journal acquired in S31. The distribution count of the journal files is set as the transaction division count in the journal acquired in S31. Namely, the journal acquiring device 14 sets, in the journal acquired in S31, the transaction division count as the information indicating how many journal files the transactions in the process underway are acquired in the way of being distributed to. Note that the processes in S33-S35 may also be executed in parallel.

For example, through the processes S33-S35, in "Tran1" of FIG. 3, the journal acquired in S31 is attached with "1" as the transaction sequence number, "DB1" as the update DB name list and "1" as the distribution count of the journal files. Further, in "Tran3" of FIG. 3, the journal acquired in S31 is attached with "3" as the transaction sequence number, "DB1, DB2" as the update DB name list and "2" as the distribution count of the journal files.

In S36, the journal acquiring device 14 acquires the journals distributed on the DB-by-DB basis into the associated journal file. The journal acquiring device 14 acquires the journals attached with the predetermined items of control information by accumulating these journals in the associated journal file through the processes in S31-S35.

Through the processes described above, the main computer 11 according to the embodiment can acquire the journals attached with the predetermined items of control information per journal by accumulating these journals in the journal file on the DB-by-DB basis in the transaction termination sequence. In the example of FIG. 3, the journals of "Tran1", "Tran2", "Tran3" and "Tran4" are accumulated in the journal file 16 associated with the DB 12 in the transaction termination sequence. Furthermore, the journals of "Tran2", "Tran3" and "Tran4" are accumulated in the journal file 17 associated with the DB 13 in the transaction termination sequence.

Herein, the processes in S33-S36 executed by the journal acquiring device 14 are given by way of one example of a procedure and steps of attaching the control information containing the identifying information of the update process and a list of the storage devices updated in the update process to the update processing data containing the update differential data per storage device to be updated when executing the update processes managed in aggregation with respect to one or more storage devices. Further, the CPU 91 etc of the main computer 11 executes the processes in S33-S36 by way of one example of a unit to attach, when executing the update processes managed in aggregation with respect to one or more storage devices, the control information containing the identifying information of the update process and the list of the storage devices updated in the update processes to the update processing data containing the update differential data per storage device to be updated.

(Sub-Computer: Reflecting Device)

Figure 12:
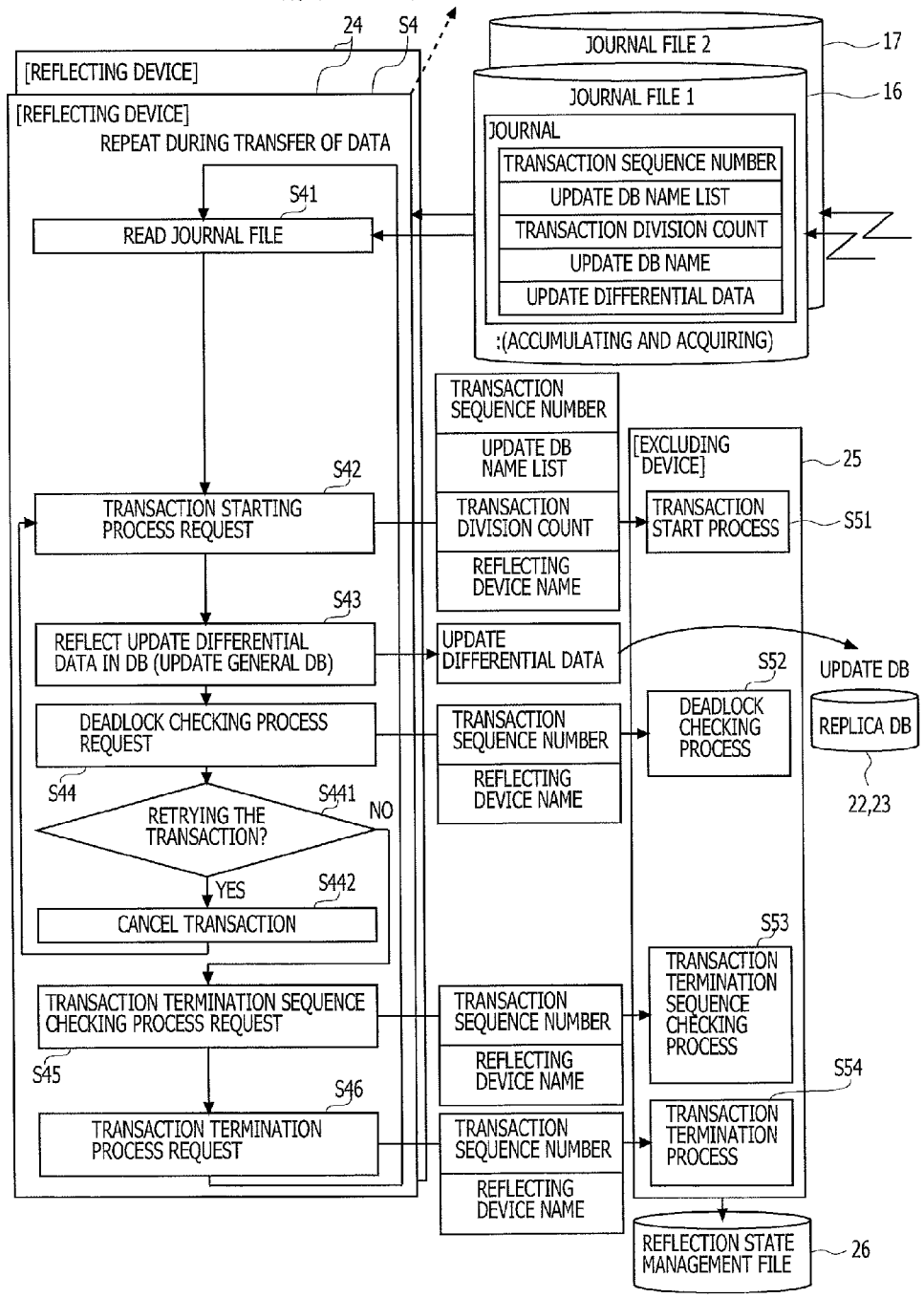
FIG. 12 is a flowchart illustrating a detailed process in S4.

FIG. 12 illustrates a detailed flowchart of the reflecting device 24 (S4 in FIG. 10B). The process in S4 illustrated in FIG. 12 is executed, e.g., in parallel per journal file. In the flowchart illustrated in FIG. 12, in S41, the reflecting device 24 of the sub-computer 21, e.g., reads the journals accumulated in the journal file 16 as triggered by an arrival of the journal file 16. Further, in S41, the reflecting device 24 of the sub-computer 21, e.g., reads the journals accumulated in the journal file 17 as triggered by an arrival of the journal file 17. The reflecting device 24, for instance, temporarily stores the thus-read journals in the predetermined area of the main storage unit 92 of the sub-computer 21, and shifts to S42.

In S42, the reflecting device 24 requests the excluding device 25 to start the transaction on the basis of the journal read in S41. In S42, the reflecting device 24 may notify the excluding device 25 of, e.g., the transaction sequence number, the update DB name list, the transaction distribution count and the reflecting device name of the journal that is read in S41. Note that the reflecting device name is the name "for journal file 1" illustrated in FIG. 10B and is also the identifying information for uniquely identifying the reflection process associated with the journal file in the reflecting device 24. Moreover, the transaction start request for the excluding device 25 in S42 may involve notifying of the reflecting device name and the transaction start request. The excluding device 25 may acquire the transaction sequence number, the update DB name list and the transaction distribution count from the notified transaction start request and the reflecting device name by referring to the journal stored in S41.

The excluding device 25 receiving the transaction start request in S42 executes the transaction starting process in S51 as triggered by the request in S42. The transaction starting process in S51, which is executed by the excluding device 25, involves implementing the initial setting of the storage value in the reflection state management file 26 on the basis of the control information attached to the journal in order to assure the matching property between the replica DBs. Moreover, the transaction starting process in S51 involves, e.g., performing the exclusion control of the journal reflecting process with respect to each replica DB on the basis of the storage value of the management table stored in the reflection state management file 26.

In S43, the reflecting device 24 executes the reflecting process of the journal that is read in S41. The reflecting device 24 executes the reflecting process on the basis of the update differential data contained in the journal with respect to, e.g., the replica DB associated with the update DB name contained in the journal. For example, in the embodiment, the reflecting process of the journal file 16 is executed by targeting on the DB 22, and the reflecting process of the journal file 17 is executed by targeting on the DB 23.

In S44, the reflecting device 24 requests the excluding device 25 for the deadlock checking process related to the transaction in the reflecting process underway. In S44, the reflecting device 24 may notify the excluding device 25 of, e.g., the transaction sequence number and the reflecting device name of the journal that is read in S41. Further, the reflecting device 24 may also notify the excluding device 25 of the reflecting device name and the deadlock checking process request, and may acquire the transaction sequence number by referring to the journal stored in S41 by the excluding device 25.

The excluding device 25 receiving the deadlock checking process in S44 executes the deadlock checking process in S52 as triggered by the request in S44. In the deadlock checking process in S52, the excluding device 25 executes the deadlock checking process with respect to the transaction related to the reflecting process in the execution underway on the basis of the information stored in the reflection state management file 26.

The reflecting device 24, if the deadlock checking process requires retrying the transaction in the reflecting process underway (S441, YES), cancels the transaction in the reflecting process underway (S442), and shifts to S42. The reflecting process 24 (reflecting device 24) shifting to S42 starts again the reflecting process with respect to the transaction canceled in S442. While on the other hand, the reflecting device 24, if the deadlock checking process does not require retrying the transaction in the reflecting process underway (S441, NO), shifts to S45.

The sub-computer 21 according to the embodiment can check the deadlock before terminating the transaction in the reflecting process underway by carrying out the processes in S44, S441 and S442, thereby enabling prevention of the deadlock due to the transaction in the reflecting process underway as described in the case 2.

In S45, the reflecting device 24 requests the excluding device 25 for a transaction termination sequence checking process about the transaction in the reflecting process underway. In S45, the reflecting device 24 may notify the excluding device 25 of, e.g., the transaction sequence number and the reflecting device name of the journal that is read in S41. Further, the reflecting device 24 may also notify the excluding device 25 of the reflecting device name and the transaction termination sequence check processing request, and may acquire the transaction sequence number by referring to the journal stored in S41 by the excluding device 25.

The excluding device 25 receiving the transaction termination sequence checking process in S45 executes the transaction termination sequence checking process in S53 as triggered by the request in S45. In the transaction termination sequence checking process in S53, the excluding device 25 executes the transaction termination sequence checking process of the transaction in the reflecting process underway for assuring the transaction termination sequence in the main computer 11 on the basis of the information stored in the reflection state management file 26.

The sub-computer 21 according to the embodiment can check the transaction termination sequence of the main computer 11 about the transaction in the reflecting process underway by performing the process in S45, thereby enabling prevention of the mismatching between the replica DBs described in the case 2.

In S46, the reflecting device 24 requests the excluding device 25 for the transaction termination process of the transaction in the reflecting process underway, and shifts to S41. In S46, the reflecting device 24 may notify the excluding device 25 of, e.g., the transaction sequence number and the reflecting device name of the journal that is read in S41. Further, the reflecting device 24 may also notify the excluding device 25 of the reflecting device name and the transaction termination sequence processing request, and may acquire the transaction sequence number by referring to the journal stored in S41 by the excluding device 25.

The excluding device 25 receiving the transaction termination process in S46 executes the transaction termination process in S54 as triggered by the request in S46. In the transaction termination process in S54, the excluding device 25 executes the transaction termination process of the transaction in the reflecting process underway on the basis of the information stored in the reflection state management file 26.

Incidentally, the reflecting device 24 shifting to S41 reads the next journal from the journal file, and executes the reflecting process in S42-S46 with a new transaction. As a result, the sub-computer 21 according to the embodiment can, as depicted by "Reflection1" in FIG. 3, reflect the journal A, the journal B and the journal C accumulated in the journal file 16 in the target DB 22 in an accumulating sequence. Moreover, the sub-computer 21 according to the embodiment can, as depicted by "Reflection2" in FIG. 3, reflect the journal P, the journal Q and the journal R accumulated in the journal file 17 in the target DB 23 in the accumulating sequence.

Herein, the processes in S41-S46 executed by the reflecting device 24 are given by way of one example of one or more reflecting procedures and steps of reflecting the update differential data in the update processing data transferred in the way of being attached with the control information from another information processing apparatus respectively in one or more storage devices of the information processing apparatus, which correspond to one or more storage devices of another information processing apparatus. Further, the CPU 91 etc of the sub-computer 21 executes the processes in S41-S46 by way of one example of one or more reflecting unit to reflect the update differential data in the update processing data transferred in the way of being attached with the control information from another information processing apparatus respectively in one or more storage devices of the information processing apparatus, which correspond to one or more storage devices of another information processing apparatus.

(Sub-Computer: Excluding Device)

Figure 13:
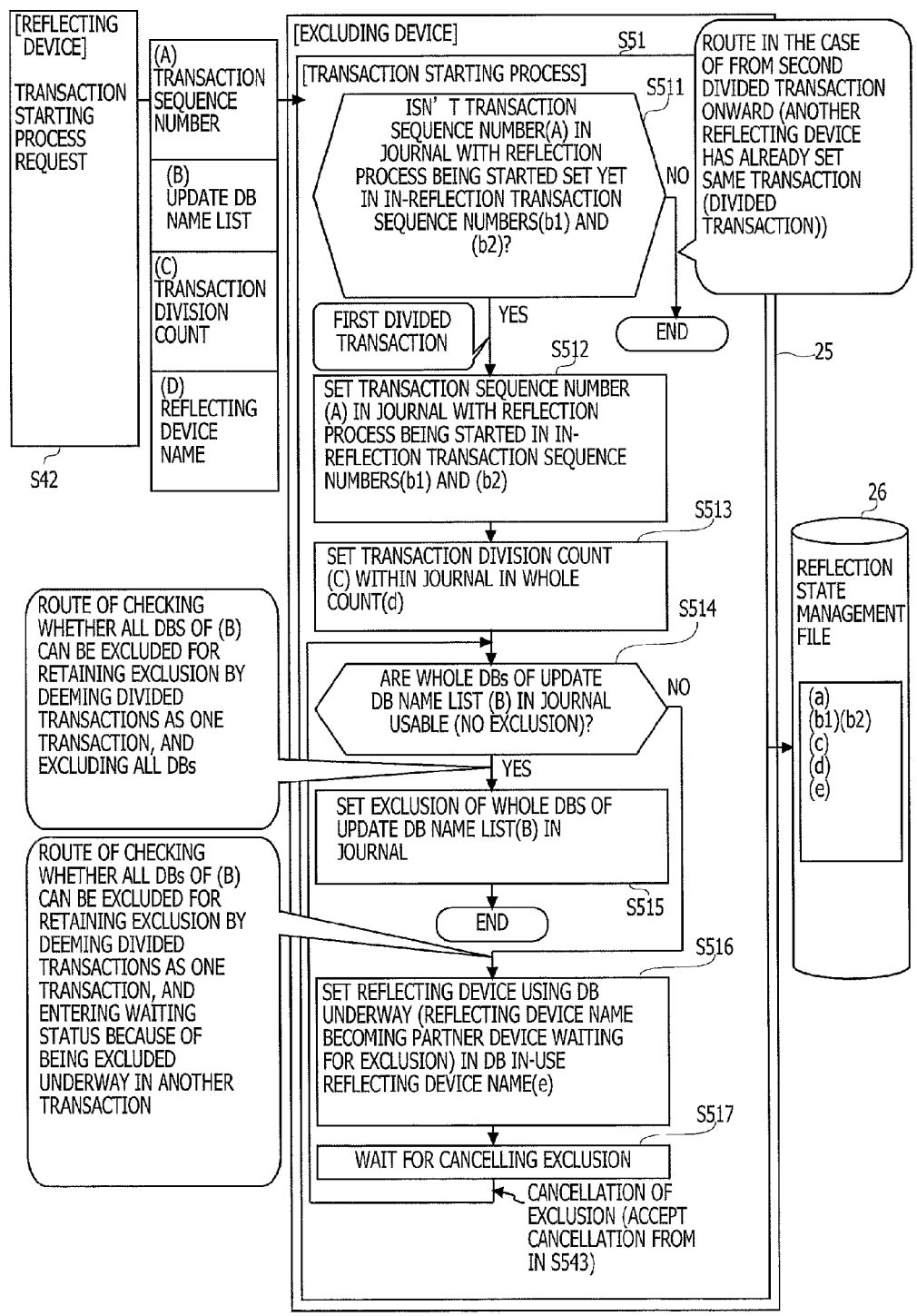
FIG. 13 is a flowchart illustrating a detailed process in S51.

FIG. 13 illustrates a detailed flowchart of S51 by the excluding device 25 (S5 in FIG. 10B). A process in S51 illustrated in FIG. 13 is executed as triggered by, e.g., a transaction start processing request in S32 by the reflecting device 24. Note that in the flowchart illustrated in FIG. 13, the description will be made on the assumption that the transaction sequence number is notated by (A), the update DB name list is notated by (B), the transaction distribution count is notated by (C), and the reflecting device name is notated by (D), which are notified through the transaction start processing request.

To begin with, in S511, the excluding device 25 refers to the management table stored in the reflection state management file 26, and determines whether the transaction sequence number (A) is not yet set, which is notified through the transaction start processing request. The excluding device 25 acquires, e.g., a storage value (b1) of "in-reflection transaction sequence number" of a record associated with the reflecting device name (D) in the management table illustrated in FIG. 5D. Further, the excluding device 25 acquires, e.g., a storage value (b2) of "in-reflection transaction sequence number" of a record associated with the reflecting device name (D) in the management table illustrated in FIG. 5E. The excluding device 25 compares the acquired storage values (b1), (b2) with the transaction sequence number (A) notified through the transaction start processing request, thereby determining whether the transaction sequence number (A) is not yet set.

In S511, the excluding device 25 shifts to S512 if the transaction sequence number (A) is not yet set (S511, YES) but terminates the process in S51 if the transaction sequence number (A) is set (S511, NO).

In S512-S513, the excluding device 25 performs initial setting of the reflection state management file 26. For instance, the excluding device 25 stores the transaction sequence number (A) in "in-reflection transaction sequence number" of the record associated with the reflecting device name (D) in the management table depicted in FIG. 5D. Moreover, the excluding device 25 stores, e.g., the transaction sequence number (A) in "in-reflection transaction sequence number" of the record associated with the reflecting device name (D) in the management table depicted in FIG. 5E (S512). Then, the excluding device 25 stores the transaction distribution count (C) in "whole count" of "transaction division count" of the record associated with the reflecting device name (D) in the management table illustrated in FIG. 5D (S513).

Through the process in S512, the transaction sequence number (A) is set in the storage value (b1) of "in-reflection transaction sequence number" of the record associated with the reflecting device name (D) in the management table depicted in FIG. 5D. Further, through the process in S512, the transaction sequence number (A) is set in the storage value (b2) of "in-reflection transaction sequence number" of the record associated with the reflecting device name (D) in the management table depicted in FIG. 5E. Then, through the process in S513, the transaction distribution count (C) is set in the storage value (d) of "whole count" of "transaction division count" of the record associated with the reflecting device name (D) in the management table illustrated in FIG. 5D.

In S514-S517, the excluding device 25 executes setting and cancelling exclusion of the reflecting process where the transaction start processing request is made. In S514, the excluding device 25 determines whether the whole DBs of the update DB name list (B) are usable or not. Namely, if the reflecting processes are distributed to the plurality of journal files, the mismatching might occur between the replica DBs in the case 1 illustrated in FIG. 6. In S514, for assuring the matching property between the transactions distributed to the plurality of journal files, it is determined whether the exclusion has already been done by the precedent reflecting process or not.

In S514, the excluding device 25, if all the DB of the reflecting process target update DB name list (B) are not yet excluded (S514, YES), after shifting to S515, sets the exclusion of all the DBs of the update DB name list (B), and terminates the process in S51. Through the processes in S514-S515, it is feasible in the precedent reflecting process to exclude all the DBs (all the DBs of the update DB name list (B)) related to the reflecting processes of the transactions distributed to the plurality of journal files. Hence, in the subsequent reflecting process, it is possible to execute the subsequent reflecting process in the way waiting for cancelling the exclusion due to the termination of the precedent reflecting process.

Whereas if any one of the DB of the reflecting process target update DB name list (B) is excluded (S514, NO), the excluding device 25 shifts to S516 and sets the wait for cancelling the exclusion with respect to the preceding transaction. In S516, the excluding device 25 sets a reflecting device name of the reflecting device becoming a partner device (using the DB to be reflected by the reflecting process) waiting for the exclusion in the management table, illustrated in FIG. 5E, of the reflection state management file 26.

For example, the excluding device 25 stores the reflecting device name of the reflecting device becoming the partner device waiting for the exclusion in "DB in-use reflecting device name" of a record associated with the reflecting device name (D) in the management table illustrated in FIG. 5E. Through a process in S516, the reflecting device name of the reflecting device becoming the partner device waiting for the exclusion is set in a storage value (e) of "DB in-use reflecting device name" of a record associated with the reflecting device name (D) in the management table depicted in FIG. 5E. In the example of FIG. 10B, for instance, a reflecting device related to "for journal file 2" in the precedent reflecting process is stored as the reflecting device name in the storage value (e) of "DB in-use reflecting device name" of the record of "for journal file 1". Similarly, in the case of "for journal file 1" being precedent, the reflecting device related to precedent "for journal file 1" is stored as the reflecting device name in the storage value (e) of "DB in-use reflecting device name" of the record of "for journal file 2" being subsequent.

In S517, the excluding device 25 waits for the precedent reflecting device to cancel the exclusion. The cancellation of the exclusion in S517 is done by a transaction termination process in S543, which will be described later on. In S517, the excluding device 25, in response to an event that the precedent reflecting device cancels the exclusion by the transaction termination process in S543, shifts to S514 and executes the initial setting of the reflecting process kept waiting for the cancellation of the exclusion.

Herein, the process executed in S515 by the excluding device 25 is one example of an exclusion setting procedure/exclusive setting step. Further, the CPU 91 etc of the sub-computer 21 executes the process in S515 by way of one example of an exclusion setting unit.

Moreover, the process executed in S517 by the excluding device 25 is one example of an exclusion cancelling procedure/exclusion cancelling step. Further, the CPU 91 etc of the sub-computer 21 executes the process in S517 by way of one example of an exclusion cancelling unit.

Figure 14:
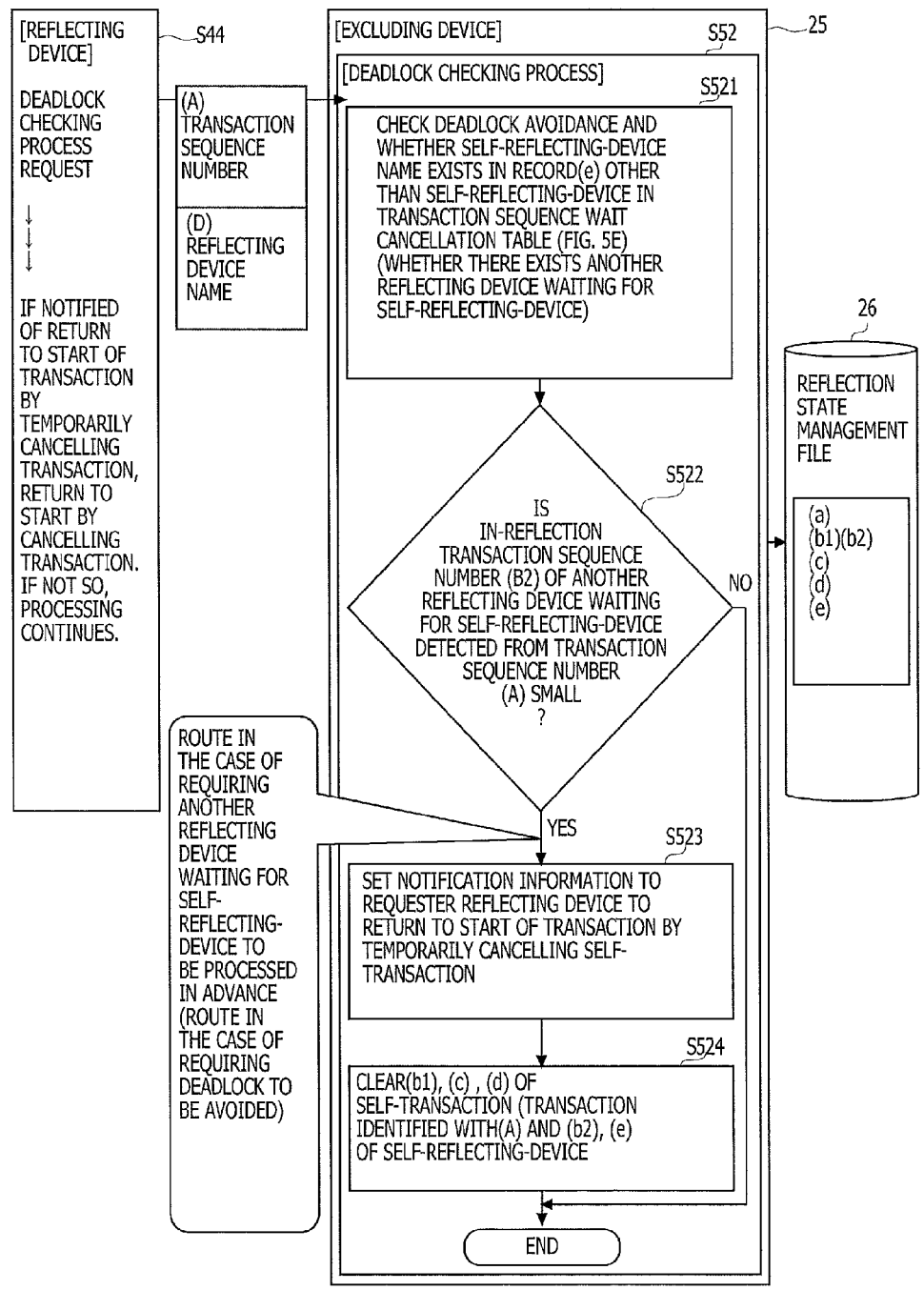
FIG. 14 is a flowchart illustrating a detailed process in S52.

Next, an in-depth description of a deadlock checking process in S52 by the excluding device 25 (S5 in FIG. 10B) will be made with reference to FIG. 14. FIG. 14 illustrates a detailed flowchart of S52. The process in S52 illustrated in FIG. 14 is executed as triggered by, e.g., a deadlock checking process request in S44 by the reflecting device 24. Note that in the flowchart depicted in FIG. 14, the description will be made on the assumption that the transaction sequence number is notated by (A), and the reflecting device name is notated by (D), which are notified through the deadlock checking process request.

At first, in S521, the excluding device 25 refers to the management tables for cancelling the deadlock and for cancelling the wait for the transaction sequence in the reflection state management file 26, and thus acquires a record associated with such a reflecting device name that the reflecting device name (D) specifies the partner device waiting for cancelling the exclusion. The excluding device 25 searches for a column of "DB in-use reflecting device name" of the record with the reflecting device name other than reflecting device name (D) by use of the reflecting device name (D) as a keyword in the management table illustrated in, e.g., FIG. 5E, thus acquiring the record of such a reflecting device name that the reflecting device name (D) specifies the partner device waiting for cancelling the exclusion.

In S522, the excluding device 25 compares the storage value (b2) in "in-reflection transaction sequence number" of the record specified by the reflecting device name acquired in S521 with the transaction sequence number (A), and determines which value, the value (b2) or the value (A), is larger in magnitude. The excluding device 25, if the record acquired in S521 contains none of such a device name that the storage value (b2) in "in-reflection transaction sequence number" is smaller than the transaction sequence number (A) (S522, NO), terminates the process in S52.

Whereas if the storage value (b2) in "in-reflection transaction sequence number" is larger than the transaction sequence number (A) (S522, YES), the excluding device 25 executes processes in S523-S524 for preventing the deadlock.

In S523, the excluding device 25 sets notification information to the reflecting device name (D) of the device that has made the deadlock checking process request. The excluding device 25, by way of the notification information to the reflecting device name (D), cancels the process related to the transaction in the reflecting process underway, and sets re-execution of S41. The notification information set in S523 is temporarily stored in a predetermined area of, e.g., the main storage unit 92 of the sub-computer 21.

In S524, the excluding device 25 carries out the process for cancelling the transaction sequence number (A) in the process underway with respect to the reflecting device name (D). The excluding device 25 clears, e.g., the setting values in the management table, which are set in S51. The excluding device 25 clears, e.g., the storage values (b1), (c) and (d) of the record associated with the reflecting device name (D) in the management table illustrated in FIG. 5D. Furthermore, the excluding device 25 clears, e.g., the storage values (b2) and (e) of the record associated with the reflecting device name (D) in the management table illustrated in FIG. 5E.

The excluding device 25, together with the termination of the process in S52, notifies the device specified by the reflecting device name (D) of the notification information set in S523. The device specified by the reflecting device name (D), which receives the notification information from the excluding device 25, executes, e.g., S441-S442 and re-executes the reflecting process related to the transaction sequence number (A) in the process underway.

Herein, the process executed by the excluding device 25 is one example of a comparing procedure and a comparing step. Further, the CPU 91 etc of the sub-computer 21 executes the process in S522 by way of one example of a comparing unit.

Moreover, the process in S523 executed by the excluding device 25 and the processes in S441-S442 executed by the reflecting device 24 are given as one example of a procedure and a step of cancelling the process of reflecting the subsequent sequence update processing data in the storage device in such a case that the sequence number of the exclusion cancellation waiting update processing data is precedent to the sequence number of the subsequent sequence update processing data being set waiting for the reflecting process termination sequence as a result of the comparison in the comparing procedure (step). Moreover, the CPU 91 etc of the sub-computer 21 executes the processes in S523 and S441-S442 by way of one example of the unit to cancel the process of reflecting the subsequent sequence update processing data in the storage device in the case where the sequence number of the exclusion cancellation waiting update processing data is precedent to the sequence number of the subsequent sequence update processing data being set waiting for the reflecting process termination sequence as a result of the comparison made by the comparing unit.

Figure 15:
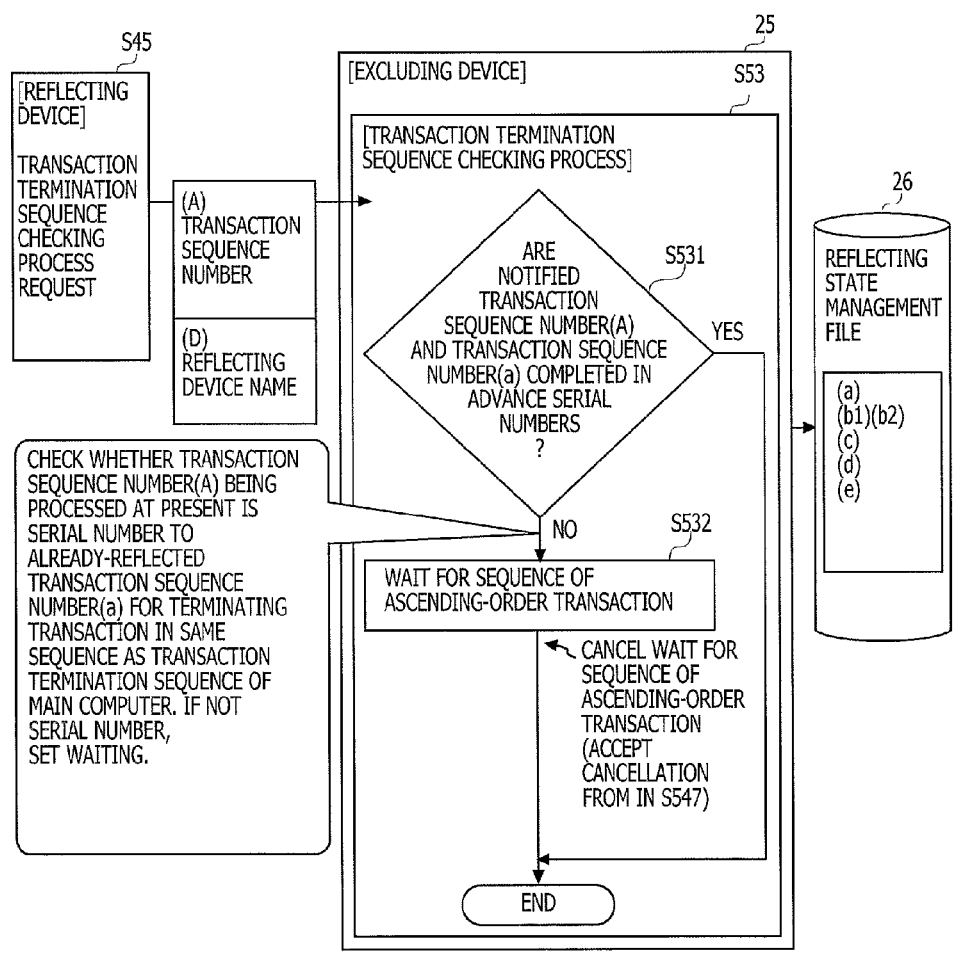
FIG. 15 is a flowchart illustrating a detailed process in S53.

Next, an in-depth description of the transaction termination sequence checking process in S53 of the excluding device 25 (S5 in FIG. 10B) will be made with reference to FIG. 15. FIG. 15 illustrates a detailed flowchart of S53. The process in S53 illustrated in FIG. 15 is executed as triggered by, e.g., a transaction termination sequence checking process request in S45 by the reflecting device 24. Note that in the flowchart depicted in FIG. 15, the description will be made on the assumption that the transaction sequence number is notated by (A), and the reflecting device name is notated by (D), which are notified through the transaction termination sequence checking process request.

To begin with, in S531, the excluding device 25 determines whether or not the transaction sequence number (A) of the reflecting device name (D) is serial to the transaction sequence number of the reflecting process being completed in advance. The excluding device 25 acquires, e.g., the storage value (a) of "reflection completed transaction sequence number" in the management table illustrated in FIG. 5C. Note that the sequence number of the transaction being completed in advance is stored in the storage value (a) of "reflection completed transaction sequence number".

The excluding device 25, for instance, if there is a consecutive ascending relationship between the transaction sequence number (A) and the storage value (a) of the "reflection completed transaction sequence number" (S531, YES), terminates the process in S53. For example, the "consecutive ascending relationship" can be exemplified by such a case that the transaction sequence number (A) is "3", and the storage value (a) of "reflection completed transaction sequence number" is "2". Note that the excluding device 25, if the storage value (a) of "reflection completed transaction sequence number" is not yet set and the transaction sequence number (A) is set to "1", determines the relationship to be the consecutive ascending relationship.

Whereas if there is no consecutive ascending relationship between the transaction sequence number (A) and the storage value (a) of the "reflection completed transaction sequence number" (S531, NO), the excluding device 25 shifts to S532. For instance, the excluding device 25, if the storage value (a) of "reflection completed transaction sequence number" is not yet set and the transaction sequence number (A) is set to a value other than "1", determines the relationship not to be the consecutive ascending relationship.

In S532, the excluding device 25 sets the transaction related to the reflecting process of transaction sequence number (A) in a waiting status for the precedent transaction sequence. For example, the excluding device 25, if the transaction sequence number (A) is set to "2" and the storage value (a) of "reflection completed transaction sequence number" is not yet set, sets the reflecting process of the transaction sequence number "2" in the waiting status for terminating the reflecting process of the preceding transaction sequence number "2". It is because this setting prevents the mismatching between the replica DBs, which occurs in the case 2 illustrated in FIG. 8, in which the occurrence sequence of the journals distributed to the plurality of journal files is different from the reflection sequence in the replica DBs.

Note that the wait for the precedent transaction sequence in S532 is done in S547 of a transaction termination process (FIG. 16) that will be described later on. The excluding device 25, upon the cancellation of the wait for the precedent transaction sequence in S547 of the preceding transaction termination process, terminates the process in S53 about transaction sequence number (A). For instance, the excluding device 25, upon the cancellation of the wait for the precedent transaction sequence in S547 of the preceding transaction sequence number "1", terminates the transaction termination sequence checking process of the transaction sequence number "2" kept waiting for the precedent transaction sequence.

Herein, the process in S531 executed by the excluding device 25 is one example of a checking procedure and a checking step. Further, the CPU 91 etc of the sub-computer 21 executes the process in S531 by way of one example of a checking unit.

Further, the process in S532 executed by the excluding device 25 is one example of a sequence control procedure and a sequence control step. Moreover, the CPU 91 etc of the sub-computer 21 executes the process in S532 by way of one example of a sequence control unit.

Figure 16:
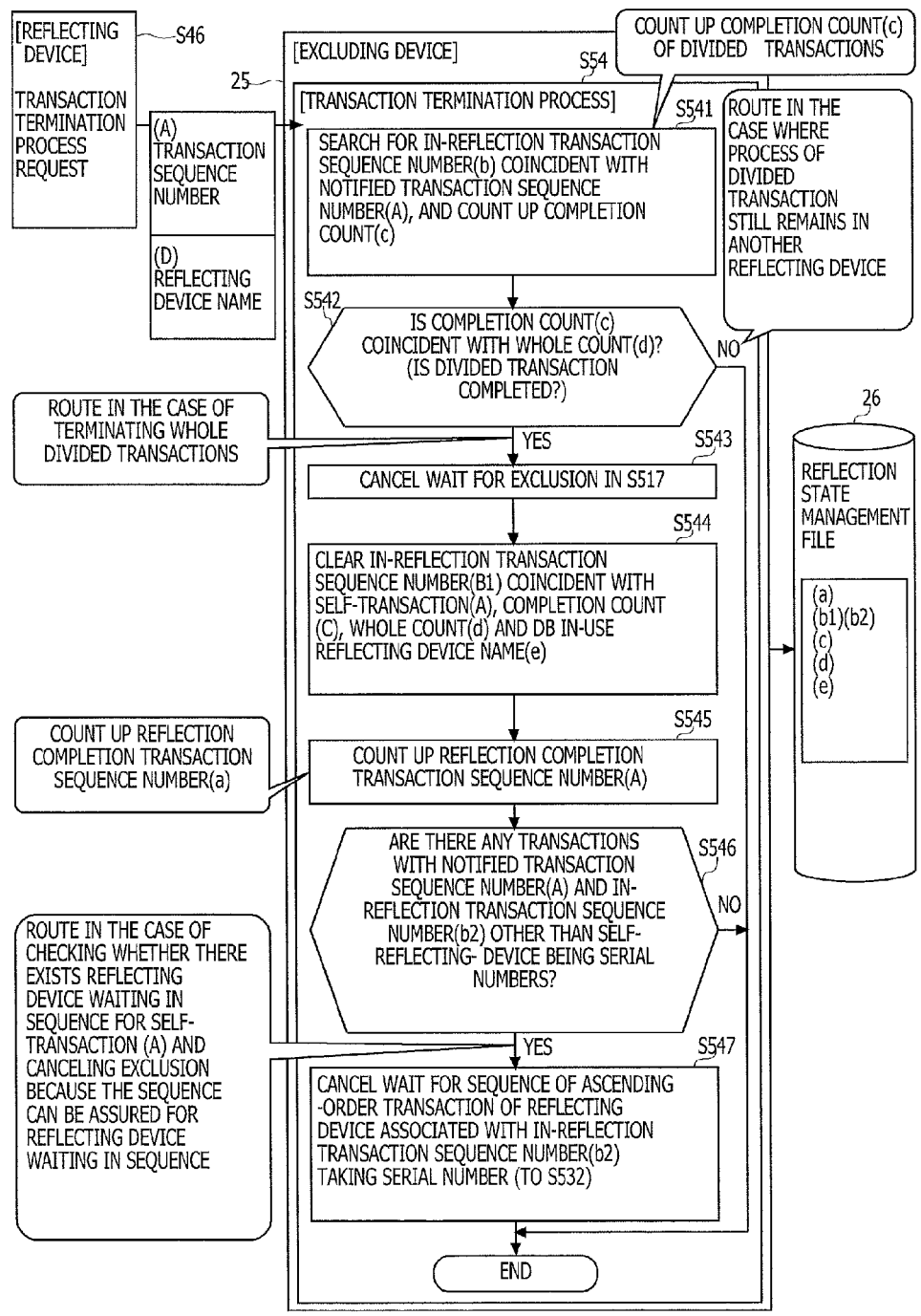
FIG. 16 is a flowchart illustrating a detailed process in S54.

Next, an in-depth description of the transaction termination process in S54 of the excluding device 25 (S5 in FIG. 10B) will be made with reference to FIG. 16. FIG. 16 illustrates a detailed flowchart of S54. The process in S54 illustrated in FIG. 16 is executed as triggered by, e.g., a transaction termination sequence processing request in S46 by the reflecting device 24. Note that in the flowchart depicted in FIG. 16, the description will be made on the assumption that the transaction sequence number is notated by (A), and the reflecting device name is notated by (D), which are notified through the transaction termination processing request.

To start with, in S541, for instance, the excluding device 25 searches for the storage value (b1) of "in-reflection transaction sequence number" of the record associated with the reflecting device name (D) by use of the transaction sequence number (A) as a keyword in the management table illustrated in FIG. 5D. Then, the excluding device 25 acquires the record containing the storage value (b1) of "in-reflection transaction sequence number", which is coincident with the transaction sequence number (A). Subsequently, the excluding device 25 counts up the storage value (c) of "completion count" of "transaction division count" registered in the same record.

In S542, the excluding device 25 compares the storage value (c) of "completion count" that is counted up in S541 with the storage value (d) of "whole count" in the same record, and thus determines whether or not these two values are coincident with each other. The excluding device 25, if the counted-up storage value (c) of "completion count" is not coincident with the storage value (d) of "whole count" in the same record (S542, NO), terminates the process in S54 without performing the processes in S543-S547.

Whereas if the counted-up storage value (c) of "completion count" is coincident with the storage value (d) of "whole count" in the same record (S542, YES), the excluding device 25 executes the processes in S543-S547. The processes in S543-S547 involve executing the cancellation of the exclusion and the cancellation of the wait for the precedent transaction sequence.

In S543, the excluding device 25 cancels the wait for the cancellation of the exclusion of the transaction related to the reflecting process that sets the wait for the cancellation of the exclusion in S517 illustrated in FIG. 13. The process in S543 leads to resumption of the transaction starting process related to the reflecting process being set in the wait for the cancellation of the exclusion in the way of being distributed to the plurality of journal files.

In S544, the excluding device 25 clears the respective storage values (b1), (c) and (d) in the record associated with the reflecting device name (D) in the management table depicted in FIG. 5D that is retrieved in S541. Further, in parallel with this operation, the excluding device 25 clears the respective storage values (b2) and (e) in the record associated with the reflecting device name (D) in the management table depicted in FIG. 5E.

In S545, the excluding device 25 counts up the storage value (a) of "reflection completed transaction sequence number" in the management table illustrated in FIG. 5C, which is stored in the reflection state management file 26. For example, the excluding device 25 counts up the value into "2" if the storage value (a) of "reflection completed transaction sequence number" is "1", and counts up the value into "1" if the storage value (a) of "reflection completed transaction sequence number" is not yet set. Namely, the storage value (a) of "reflection completed transaction sequence number" that is counted up in the process of S545 is coincident with the transaction sequence number (A) being processed underway.

In S546, the excluding device 25 refers to the reflection state management file 26 and thus determines whether or not there exists the reflecting process waiting for the termination of the transaction of the transaction sequence number (A) of the reflecting device name (D). The excluding device 25 refers to the management table illustrated in FIG. 5E and thus acquires the record associated with the reflecting device name other than the reflecting device name (D). Then, the excluding device 25 determines whether the relationship between the transaction sequence number (A) and the storage value (b2) of "in-reflection transaction sequence number" of the acquired record is the consecutive ascending relationship or not. For instance, the consecutive ascending relationship can be exemplified by such a case that the transaction sequence number (A) is "1" and the storage value (b2) of "in-reflection transaction sequence number" is "2".

The excluding device 25 shifts to S547 if the relationship between the transaction sequence number (A) and the storage value (b2) of "in-reflection transaction sequence number" of the acquired record is the consecutive ascending relationship (S546, YES). Whereas if the relationship between the transaction sequence number (A) and the storage value (b2) of "in-reflection transaction sequence number" of the acquired record is not the consecutive ascending relationship (S546, NO), the excluding device 25 finishes the transaction termination process in S54.

In S547, the excluding device 25 cancels the wait for the precedent transaction sequence of the transaction related to the reflecting process being set in the wait for the transaction termination sequence in S532 illustrated in FIG. 15. The process in S547 leads to resumption of the transaction termination sequence checking process related to the reflecting process being set in the wait for the transaction termination sequence in the way of being distributed to the plurality of journal files.

(Time Chart: Case 1)

Figure 17:
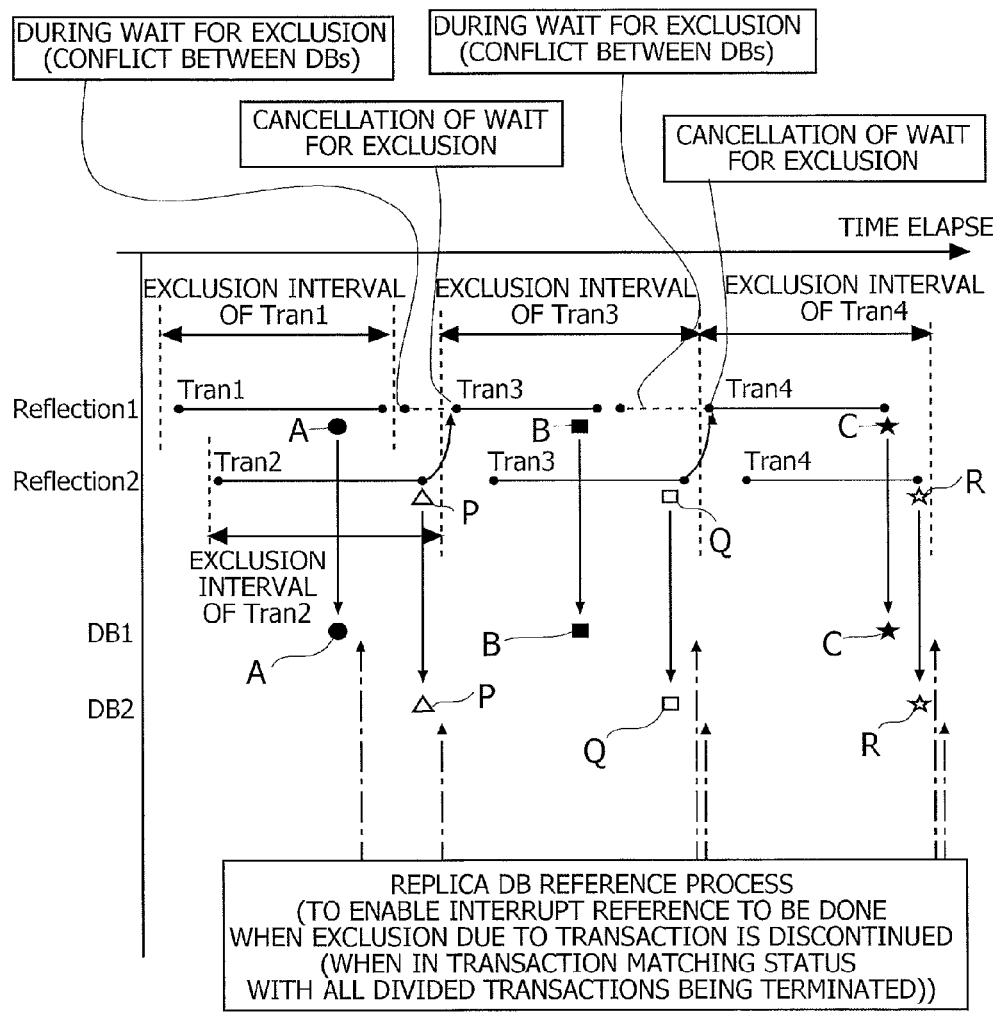
FIG. 17 is an explanatory time chart of an excluding process in the embodiment.

Next, a time chart of the reflecting process in the replica DB in the mode of the case 1 depicted in FIG. 7 will be described. FIG. 17 illustrates the time chart of the reflecting process in the replica DB in the mode of the case 1 depicted in FIG. 7. In FIG. 17, a time elapse in the reflecting process is indicated along the axis of abscissa. Then, "Reflection1" in an illustrated example represents the reflecting process executed by, e.g., the reflecting device "for journal file 1", while "Reflection2" represents the reflecting process executed by, e.g., the reflecting device "for journal file 2". The transaction pertaining to each reflecting process is expressed as "TranX". Upon completion of the reflecting process of each "TranX" of "Reflection1", the journal A, the journal B and the journal C are reflected respectively in the database "DB1". Moreover, upon the completion of the reflecting process of each "TranX" of "Reflection2", each of the journal P, the journal Q and the journal R is reflected in the database "DB2". For example, the data base "DB1" corresponds to the DB 22 of the sub-computer 21, and "DB2" corresponds to the DB 23 of the sub-computer 21. Note that "Reflection1" and "Reflection2" are executed in parallel.

At first, in "Tran1" of "Reflection1", the reflecting process target database "DB1" is excluded (S515) in the transaction starting process (S41-S51) pertaining to the reflecting process of "Tran1", and the exclusion of the reflecting process target database "DB1" is cancelled in the transaction termination process (S46-S54). An exclusion interval of "Tran1" is a period extending from the transaction starting process related to the reflecting process of "Tran1" to the completion of the transaction termination process. Within the exclusion interval of "Tran1", the reflecting process in the replica DBs of the sub-computer 21 is excluded. Incidentally, after completing the transaction termination process of "Tran1", the journal A with respect to "DB1" is updated. The sub-computer 21 executes, e.g., an interrupt process as triggered by the completion of the reflecting process of "Tran1" and is thereby enabled to refer to "DB1" serving as the replica DB.

The execution of the same reflecting process is applied to "Tran2" of "Reflection2", and within the exclusion interval of "Tran2", the reflecting process in the "DB2" of the sub-computer 21 is excluded. After completing the transaction termination process of "Tran2", the journal P with respect to "DB2" is updated. The sub-computer 21 executes, e.g., the interrupt process as triggered by the completion of the reflecting process of "Tran2" and is thereby enabled to refer to "DB2" serving as the replica DB.

In the exclusion interval of "Tran2" illustrated in FIG. 17, "DB2" is excluded (S515), and hence "Tran3" of "Reflection1" is set waiting for cancelling the exclusion of "Tran2" of "Reflection2" (S514, NO→S516→S517). Namely, the transaction starting process of "Tran3" of "Reflection1" is executed after cancelling the exclusion of preceding "Tran2" of "Reflection2" in S543, and therefore the transaction termination sequence between the replica DBs is assured.

Next, "Tran3" with the distribution to the journal files will be explained. The transaction starting process of "Tran3" illustrated in FIG. 17 is carried out after cancelling the exclusion of "Tran2" of "Reflection2". The databases "DB1" and "DB2" are excluded by the excluding process (S515) of preceding "Tran3" of "Reflection1". Then, the transaction starting process of subsequent "Tran3" of "Reflection1" is executed after cancelling the exclusion of preceding "Tran3" of "Reflection1" in S543. Therefore, the exclusion interval of "Tran3" becomes a period extending from the starting process of "Tran3" of "Reflection1" to the transaction termination process of "Tran3" of "Reflection2". Accordingly, in the exclusion interval of "Tran3", it is unfeasible to execute the reflecting process with respect to "DB1" and "DB2", and it does not therefore happen that the transaction to reflect the journals is initiated. Further, in the exclusion interval of "Tran3", it follows that the process of referring to "DB1" and "DB2" defined as the replica DBs of the sub-computer 21 is restricted. The process of referring to the replica DBs of the sub-computer 21 is executed after the journal B and the journal Q have been reflected, and hence it does not happen that the mismatching occurs between the replica DBs as described in the case 1.

(Time Chart: Case 2)

Figure 18:
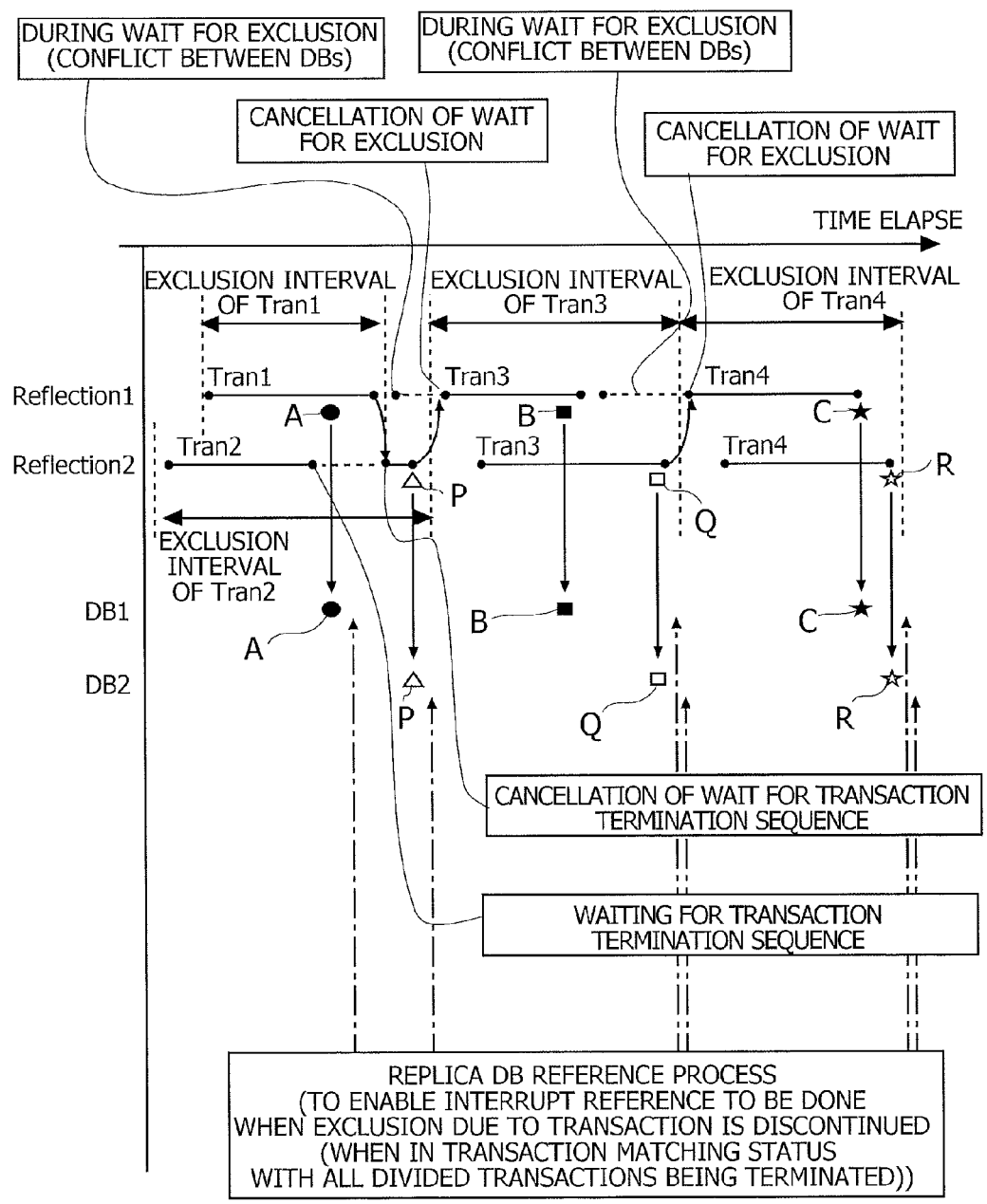
FIG. 18 is an explanatory time chart of the excluding process in the embodiment.

Next, a time chart of the reflecting process in the replica DB in the mode of the case 2 depicted in FIG. 9 will be described. FIG. 18 illustrates the time chart of the reflecting process in the replica DB in the mode of the case 2 depicted in FIG. 9. In FIG. 18, a time elapse in the reflecting process is indicated along the axis of abscissa, and "ReflectionX", "DBX", "TranX", etc are the same as those in FIG. 17.

In the mode of the case 2, the mismatching occurring between the replica DBs is derived from a difference between the occurrence sequence of the journals contained in the distributed journal files and the update reflection sequence in the replica DBs. Therefore, in the example of FIG. 18, "Tran2" of "Reflection2" is executed in advance of "Tran1" of "Reflection1".

To begin with, in preceding "Tran2" of "Reflection2", the reflection target "DB2" is excluded by the transaction starting process (S41-S51) of "Tran2". Then, in "Tran2" of "Reflection2", the transaction termination sequence checking process (S45-S53) is executed. In the transaction termination sequence checking process of "Tran2", the transaction sequence number (A) is "2", and "reflection completed transaction sequence number" illustrated in FIG. 5C is not yet set (S531, NO), and hence the wait for cancelling the exclusion in S532 is carried out. Namely, preceding "Tran2" of "Reflection2" waits for executing the transaction termination process (S46-S54) of "Tran1" of subsequence "Reflection1". Accordingly, the exclusion of "DB2" by "Tran2" continues, and hence, for instance, it does not happen that the sub-computer 21 executes the process of referring to "DB2".

During the wait for cancelling the exclusion of preceding "Tran2" of "Reflection2", the transaction starting process (S41-S51) of "Tran1" of "Reflection1" is carried out, and the reflection target "DB1" is excluded. Then, the transaction termination process (S46-S54) of "Tran1" of subsequence "Reflection1" is executed. In the transaction termination process of "Tran1" of subsequence "Reflection1", the transaction sequence number is "1", while the storage value (b2) of "in-reflection transaction sequence number" associated with "Reflection2" is "2", and hence the processes in S546-S547 are carried out. As a result, there is cancelled the exclusion of the reflecting process kept waiting for the cancelling the exclusion in the transaction termination sequence checking process of preceding "Tran2" of "Reflection2", and the transaction termination sequence checking process of "Tran2" is terminated.

Thereafter, with the completion of "Tran1" of "Reflection1", the journal A is reflected in "DB1". At this point of time, the exclusion interval of "Tran1" is ended, and therefore the sub-computer 21 executes the interrupt process etc, whereby "DB1" with the journal A being reflected therein can be referred to. As illustrated in FIG. 18, even when finishing the exclusion interval of "Tran1", the exclusion interval of "Tran2" is continued, and hence the sub-computer 21 does not refer to "DB2". That is, the mismatching does not occur between the replica DBs in the case 2.

Thereafter, preceding "Tran2" of "Reflection2" is completed, and the journal P is reflected in "DB2". Then, with the completion of "Tran2", the exclusion interval of "Tran2" terminates. At this point of time, in "DB2" to which the sub-computer 21 can refer, the reflection of the journal P is completed. Namely, the computer system 10 according to the embodiment, even when the occurrence sequence of the journals contained in the distributed journal files is different from the update reflection sequence in the replica DBs, can assure the transaction termination sequence of the main computer 11.

Note that as described in the case 2, if preceding "Tran2" in "Reflection2" is distributed to the plurality of journal files, the deadlock state might arise. In the computer system 10 according to the embodiment, even if preceding "Tran2" in "Reflection2" is distributed to the plurality of journal files, the deadlock can be cancelled beforehand.

For instance, in the example of FIG. 18, in the transaction starting process of "Tran2" of "Reflection2" that is distributed to the plurality of journal files, all the target DBs ("DB1", "DB2") are excluded (S515). In subsequent "Tran1" of "Reflection1", the target "DB1" is excluded by preceding "Tran2" of "Reflection2", and therefore the processes in S516-S517 are executed in the transaction starting process of "Tran1". Namely, in "Tran1" of "Reflection1", the reflecting device name of "Reflection2" is stored in the storage value (e) of "DB in-use reflecting device name" illustrated in FIG. 5E, resulting in the wait for cancelling the exclusion (S517).

Thereafter, in "Tran2" of "Reflection2", the processes in S522-S524 are executed in the deadlock checking process (S44-S52). That is, the transaction sequence number (A) of "Tran2" of "Reflection2" is "2", and the storage value (b2) of "in-reflection transaction sequence number" of "Tran1" of "Reflection1" is "1". Hence, in the processes of S522-S524, "Tran2" of "Reflection2" is cancelled, and the notifying process is executed to get back to the transaction starting process. As a result, in "Tran2" of "Reflection2" undergoing the notifying process, it follows that "Tran2" being executed underway is cancelled (S441-S442), and the exclusion of "DB1" is cancelled. In subsequent "Tran1" of "Reflection1", the transaction starting process of "Tran1" is executed as triggered by cancelling the exclusion of "DB1".

Thus, in the computer system 10 according to the embodiment, even when such a situation arises that the deadlock will occur, the reflecting process of reaching the deadlock state ("Tran2" of "Reflection2") can be cancelled beforehand. Therefore, "Tran2" preceding in "Reflection2" is distributed to the plurality of journal files, even in which case the deadlock state can be avoided.

<<Non-Transitory Computer-Readable Recording Medium>>

A program to make a computer, other machines and apparatuses (which will hereinafter be referred to as the computer etc) realize any one of the functions can be recorded on a non-transitory recording medium readable by the computer etc. Then, the computer etc is made to read and execute the program on this non-transitory recording medium, whereby the function thereof can be provided.

Herein, the non-transitory recording medium readable by the computer etc connotes a non-transitory recording medium capable of accumulating information such as data and programs electrically, magnetically, optically, mechanically or by chemical action, which can be read from the computer etc. Among these non-transitory recording mediums, for example, a flexible disc, a magneto-optic disc, a CD-ROM, a CD-R/W, a DVD, a Blu-ray disc, a DAT, an 8 mm tape, a memory card such as a flash memory, etc are given as those removable from the computer etc. Further, a hard disc, a Read-Only Memory (ROM), etc are given as the non-transitory recording mediums fixed within the computer etc.

According to the information processing system described above, it is feasible to provide the technology for ensuring the matching property of data between the plurality of storage devices in which to reflect the results of the update processes even when distributing the update differential data with respect to the plurality of storage devices to plural pieces of update processing data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
  a first information processing apparatus including a plurality of first storage devices; and
  a second information processing apparatus including a plurality of second storage devices in which to reflect results of update processes with respect to the plurality of first storage devices,
  the first information processing apparatus including:
    a unit to attach control information containing identifying information of each of the update processes and a list of one or more first storage devices of the plurality of first storage devices updated by the update processes to update processing data per storage device when executing the update processes managed in aggregation to update the one or more first storage devices; and
    a unit to transfer the update processing data attached with the control information to the second information processing apparatus;
  the second information processing apparatus including:
    one or more reflecting units to reflect the update processing data attached with the control information and thus transferred from the first information processing apparatus in each of one or more second storage devices of the plurality of second storage devices, which correspond to the one or more first storage devices;
    a waiting setting unit to set, when a first reflecting unit among the one or more reflecting units reflects start update processing data in a corresponding storage device among the plurality of second storage devices, waiting control in the one or more second storage devices which correspond to the one or more first storage devices updated by the update processes of the first information processing apparatus, the one or more first storage devices being given in the list, the waiting control making a subsequent reflecting unit wait for an end of a precedent reflecting unit when the precedent reflecting unit is reflecting the update processing data and the subsequent reflecting unit has not started to reflect the update processing data in the one or more second storage devices; and
    a waiting cancelling unit to cancel, when a second reflecting unit among the one or more reflecting units reflects end update processing data in a corresponding storage device among the plurality of second storage devices, the waiting control of the one or more second storage devices which correspond to the one or more first storage devices updated by the update processes of the first information processing apparatus, the one or more first storage devices being given in the list, wherein the identifying information is a sequence number indicating an update process termination sequence, and the second information processing apparatus further includes:

a checking unit to check whether or not update processes of reflecting plural pieces of update processing data in the one or more second storage devices are executed in an order of the sequence number; and a sequence control unit to cause termination of an update process of reflecting update processing data in a corresponding storage device among the plurality of second storage devices with the sequence number being subsequent to wait till an update process of reflecting update processing data with the sequence number being precedent is terminated.

2. The information processing system according to claim 1, further comprising:

a comparing unit to compare a sequence number of cancellation waiting update processing data to be reflected in the one or more second storage devices after cancelling the waiting control with a sequence number of subsequent update processing data of which the termination is caused to wait till the update process of reflecting the update processing data with the sequence number being precedent is terminated; and a unit to cancel, when the sequence number of the exclusion cancellation waiting update processing data is precedent to the sequence number of the subsequent update processing data of which the termination is caused to wait as a result of a comparison made by the comparing unit, the update process of reflecting the subsequent update processing data in the one or more second storage devices.

3. An information processing method in an information processing system including: a first information processing apparatus including a plurality of first storage devices; and a second information processing apparatus including a plurality of second storage devices in which to reflect results of update processes with respect to the plurality of the first storage devices, the information processing method comprising a method by the first information processing apparatus and a method by the second information processing apparatus, the method by the first information processing apparatus, comprising:

a procedure of attaching control information containing identifying information of each of the update processes and a list of one or more first storage devices of the plurality of first storage devices updated by the update processes to update processing data per storage device when executing the update processes managed in aggregation to update the one or more first storage devices; and a procedure of transferring the update processing data attached with the control information to the second information processing apparatus;

the method by the second information processing apparatus, comprising:

one or more reflecting procedures of reflecting the update processing data attached with the control information and thus transferred from the first information processing apparatus in each of one or more second storage devices of the plurality of second storage devices, which correspond to the one or more first storage devices;

a waiting setting procedure of setting, when a first reflecting procedure among the one or more reflecting procedures reflects start update processing data in a corresponding storage device among the plurality of second storage devices, waiting control in the one or more second storage devices which correspond to the one or more first storage devices updated by the update processes of the first information processing apparatus, the one or more first storage devices being given in the list, the waiting control making a subsequent reflecting procedure wait for an end of a precedent reflecting procedure when the precedent reflecting procedure is reflecting the update processing data and the subsequent reflecting procedure has not started to reflect the update processing data in the one or more second storage devices; and a waiting cancelling procedure of cancelling, when a second reflecting procedure among the one or more reflecting procedures reflects end update processing data in a corresponding storage device among the plurality of second storage devices, the waiting control of the one or more second storage devices which correspond to the one or more first storage devices updated by the update processes of the first information processing apparatus, the one or more first storage devices being given in the list, wherein the identifying information is a sequence number indicating an update process termination sequence, and the method by the second information processing apparatus, further comprising:

a checking procedure of checking whether or not update processes of reflecting plural pieces of update processing data in the one or more second storage devices are executed in an order of the sequence number; and a sequence control procedure of causing termination of an update process of reflecting update processing data in a corresponding storage device among the plurality of second storage devices with the sequence number being subsequent to wait till an update process of reflecting update processing data with the sequence number being precedent is terminated.

4. The information processing method according to claim 3, the method by the second information processing apparatus, further comprising:

a comparing procedure of comparing a sequence number of cancellation waiting update processing data to be reflected in the one or more second storage devices after cancelling the waiting control with a sequence number of subsequent update processing data kept in the status of of which the termination is caused to wait till the update process of reflecting the update processing data with the sequence number being precedent is terminated; and a procedure of cancelling, when the sequence number of the cancellation waiting update processing data is precedent to the sequence number of the subsequent update processing data of which the termination is caused to wait as a result of a comparison made by the comparing procedure, the update process of reflecting the subsequent update processing data in the one or more second storage devices.

5. A non-transitory computer-readable recording medium having stored therein a program for causing a computer of a second information processing apparatus including a plurality of second storage devices, to execute a reflecting process to reflect results of update processes applied to a plurality of first storage devices possessed by a first information processing apparatus, the program to cause the computer to perform:

reflecting update processing data attached with control information and thus transferred from the first information processing apparatus in each of one or more second storage devices of the plurality of second storage devices, which correspond to one or more first storage devices of the plurality of first storage devices;

setting, when a first reflecting reflects start update processing data in a corresponding storage device among the plurality of second storage devices, waiting control in the one or more second storage devices which correspond to the one or more first storage devices updated by the update processes of the first information processing apparatus, the one or more first storage devices being given in a list of the one or more first storage devices, the waiting control making subsequent reflecting wait for an end of precedent reflecting when the update processing data is under reflecting in the one or more second storage devices by the precedent reflecting and the subsequent reflecting has not started; and cancelling, when a second reflecting reflects end update processing data in a corresponding storage device among the plurality of second storage devices, the waiting control of the one or more second storage devices which correspond to the one or more first storage devices updated by the update processes of the first information processing apparatus, the one or more first storage devices being given in the list, wherein the control information contains a sequence number indicating an update process termination sequence, the program to cause the computer to further perform:

checking whether or not update processes of reflecting plural pieces of update processing data in the one or more second storage devices are executed in an order of the sequence number; and causing termination of an update process of reflecting update processing data in a corresponding storage device among the plurality of second storage devices with the sequence number being subsequent to wait till an update process of reflecting update processing data with the sequence number being precedent is terminated.

6. The non-transitory computer-readable recording medium storing the program according to claim 5, the program to cause the computer to further perform:

comparing a sequence number of cancellation waiting update processing data to be reflected in the one or more second storage devices after cancelling the waiting control with a sequence number of subsequent update processing data of which the termination is caused to wait till the update process of reflecting the update processing data with the sequence number being precedent is terminated; and cancelling, when the sequence number of the cancellation waiting update processing data is precedent to the sequence number of the subsequent update processing data of which the termination is caused to wait as a result of a comparison made by the comparing, the update process of reflecting the subsequent update processing data in the one or more second storage devices.

* * * * *